United States Patent
Shaw et al.

(10) Patent No.: US 11,555,352 B2
(45) Date of Patent: *Jan. 17, 2023

(54) MULTIMODE STEERING AND HOMING SYSTEM, METHOD AND APPARATUS

(71) Applicant: Merlin Technology, Inc., Kent, WA (US)

(72) Inventors: Timothy Shaw, Auburn, WA (US); John E. Mercer, Gig Harbor, WA (US); Albert W. Chau, Woodinville, WA (US)

(73) Assignee: Merlin Technology, Inc., Kent, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/209,177

(22) Filed: Mar. 22, 2021

(65) Prior Publication Data

US 2021/0207438 A1 Jul. 8, 2021

Related U.S. Application Data

(63) Continuation of application No. 16/588,836, filed on Sep. 30, 2019, now Pat. No. 10,954,719, which is a
(Continued)

(51) Int. Cl.
 *E21B 44/00* (2006.01)
 *E21B 7/06* (2006.01)
(Continued)

(52) U.S. Cl.
 CPC .............. *E21B 7/06* (2013.01); *E21B 44/005* (2013.01); *E21B 47/024* (2013.01);
(Continued)

(58) Field of Classification Search
 CPC .......... E21B 7/06; E21B 44/00; E21B 44/005; E21B 47/02224; E21B 47/024;
(Continued)

(56) References Cited

U.S. PATENT DOCUMENTS

| | | |
|---|---|---|
| 5,133,417 A | 7/1992 | Rider |
| 6,005,532 A | 12/1999 | Ng |

(Continued)

FOREIGN PATENT DOCUMENTS

| | | |
|---|---|---|
| CN | 103195414 | 7/2013 |
| WO | 2013-103875 A1 | 7/2013 |
| WO | 2014-152019 A1 | 9/2014 |

OTHER PUBLICATIONS

The International Search Report and the Written Opinion of the International Searching Authority for International Application No. PCT/US2016/027166 which is associated with U.S. Appl. No. 14/864,800, dated Aug. 25, 2016, Moscow, Russia.

(Continued)

*Primary Examiner* — Taras P Bemko
(74) *Attorney, Agent, or Firm* — Pritzkau Patent Group LLC

(57) ABSTRACT

A boring tool is movable through the ground. A transmitter supported by the boring tool transmits an electromagnetic homing signal. A portable device monitors the electromagnetic homing signal and receives the electromagnetic homing signal in a homing mode for guiding the boring tool to a target position. A processor generates steering commands for guiding the boring tool based on a bore plan in a steering mode such that at least some positional error is introduced without using the electromagnetic homing signal. Switching from the steering mode to the homing mode is based on monitoring of the electromagnetic homing signal as the boring tool approaches the portable device to then guide the boring tool to the target position location in compensation for the positional error. Intermediate target positions are described as well as guiding the boring tool based on the homing signal so long as the portable device receives the signal.

7 Claims, 10 Drawing Sheets

Related U.S. Application Data continuation of application No. 15/675,439, filed on Aug. 11, 2017, now Pat. No. 10,428,583, which is a continuation of application No. 14/864,800, filed on Sep. 24, 2015, now Pat. No. 9,759,012.

(51) Int. Cl.

| | | |
|---|---|---|
| G01V 3/34 | (2006.01) | |
| G01V 3/38 | (2006.01) | |
| E21B 47/024 | (2006.01) | |
| G01V 3/18 | (2006.01) | |
| E21B 47/13 | (2012.01) | |
| E21B 47/0232 | (2012.01) | |
| G01V 3/08 | (2006.01) | |
| G01V 3/15 | (2006.01) | |

(52) U.S. Cl.
CPC .......... *E21B 47/0232* (2020.05); *E21B 47/13* (2020.05); *G01V 3/081* (2013.01); *G01V 3/15* (2013.01); *G01V 3/18* (2013.01); *G01V 3/34* (2013.01); *G01V 3/38* (2013.01)

(58) Field of Classification Search
CPC ........ E21B 47/122; G01V 3/081; G01V 3/15; G01V 3/18; G01V 3/34; G01V 3/38
USPC .......................................................... 175/24
See application file for complete search history.

(56) References Cited

U.S. PATENT DOCUMENTS

| | | | |
|---|---|---|---|
| 6,014,026 A | 1/2000 | Mercer | |
| 6,035,951 A | 3/2000 | Mercer et al. | |
| 6,079,506 A | 6/2000 | Mercer | |
| 6,250,402 B1 | 6/2001 | Brune et al. | |
| 6,389,360 B1 | 5/2002 | Alft et al. | |
| 6,417,666 B1 | 7/2002 | Mercer | |
| 6,470,976 B2 | 10/2002 | Alft et al. | |
| 6,484,818 B2 | 11/2002 | Alft et al. | |
| 6,496,008 B1 | 12/2002 | Brune et al. | |
| 6,717,410 B2 | 4/2004 | Mizuno | |
| 6,727,704 B2 | 4/2004 | Brune et al. | |
| 6,854,535 B1 | 2/2005 | Mizuno | |
| 6,868,921 B2 | 3/2005 | Burrows et al. | |
| 7,425,829 B2 | 9/2008 | Zeller et al. | |
| 7,775,301 B2 | 8/2010 | Brune et al. | |
| 8,695,727 B2 | 4/2014 | Chau et al. | |
| 8,729,901 B2 | 5/2014 | Lam et al. | |
| 2003/0102868 A1 | 6/2003 | Brune | |
| 2008/0129299 A1 | 6/2008 | Mercer | |
| 2010/0243326 A1 | 9/2010 | Jin | |
| 2012/0218863 A1 | 8/2012 | Chau et al. | |
| 2013/0146356 A1 | 6/2013 | Brune | |
| 2013/0175092 A1 | 7/2013 | Kolpack et al. | |
| 2013/0176139 A1 | 7/2013 | Chau et al. | |
| 2014/0020953 A1 | 1/2014 | Chau et al. | |
| 2014/0055278 A1 | 2/2014 | Chau et al. | |
| 2014/0138156 A1 | 5/2014 | Brune | |
| 2014/0144704 A1 | 5/2014 | Cole et al. | |
| 2014/0262513 A1 | 9/2014 | Chau et al. | |

OTHER PUBLICATIONS

Extended European Search Report for European Application No. 16781993.7 which is associated with International Application No. PCT/US2016/027166 which is associated with U.S. Appl. No. 14/864,800, dated Jan. 24, 2018, Munich, Germany.

The International Preliminary Report on Patentability for International Application No. PCT/US2016/027166 which is associated with U.S. Appl. No. 14/864,800, dated Mar. 27, 2018, Geneva, Switzerland.

The First Office Action of the National Intellectual Property Administration of the Peoples Republic of China for Application No. 201680001466.0 which is related to PCT Application No. PCT/US2016/027166 which is related to U.S. Appl. No. 14/864,800 dated Mar. 11, 2020. (English Translation Provided).

The Second Office Action of the National Intellectual Property Administration of the Peoples Republic of China for Application No. 201680001466.0 which is related to PCT Application No. PCT/US2016/027166 which is related to U.S. Appl. No. 14/864,800 dated Aug. 28, 2020. (English Translation Provided).

MULTIMODE STEERING AND HOMING SYSTEM, METHOD AND APPARATUS

RELATED APPLICATIONS

This application is a continuation application of copending U.S. patent application Ser. No. 16/588,836, filed on Sep. 30, 2019 and now issued as U.S. Pat. No. 10,954,719 on Mar. 23, 2022, which is a continuation application of U.S. patent application Ser. No. 15/675,439, filed on Aug. 11, 2017 and issued as U.S. Pat. No. 10,428,583 on Oct. 1, 2019, which is a continuation application of U.S. patent application Ser. No. 14/864,800 filed on Sep. 24, 2015 and issued as U.S. Pat. No. 9,759,012 on Sep. 12, 2017, the disclosures of which are incorporated herein by reference in their entirety.

BACKGROUND OF THE INVENTION

The present application is generally related to steering tools for horizontal directional drilling and, more particularly, to a system and method for multimode use of steering information and homing information.

A boring tool is well-known as a steerable drill head that can carry sensors, transmitters and associated electronics. The boring tool is usually controlled through a drill string that is extendable from a drill rig. The drill string is most often formed of drill pipe sections, which may be referred to hereinafter as drill rods, that are selectively attachable with one another for purposes of advancing and retracting the drill string. Steering is often accomplished using a beveled face on the drill head. Advancing the drill string while rotating should result in the drill head traveling straight forward, whereas advancing the drill string with the bevel oriented at some fixed angle will result in deflecting the drill head in some direction.

One approach that has been taken by the prior art, for purposes of monitoring the progress of a boring tool in the field of horizontal directional drilling, resides in what is commonly referred to as a "steering tool". This term has come to describe an overall system which essentially predicts the position of the boring tool, as it is advanced through the ground using a drill string, such that the boring tool can be steered along a planned drill path within the ground. Steering tool systems are considered as being distinct from other types of locating systems used in horizontal directional drilling at least for the reason that the position of the boring tool is monitored in a step-wise fashion as the boring tool progresses through the ground. For each position of the boring tool, pitch and yaw angles of the drill-head can be measured in coordination with extension of the drill string. From this, the boring tool position coordinates are obtained by numerical integration. Nominal or measured drill rod lengths can serve as a step size during integration. For this reason, positional error can accumulate with increasing progress through the ground. The positional error can be attributed, at least in part, to pitch and yaw measurement errors as well as underground disturbances of the earth's magnetic field, which can cause yaw measurement bias errors. Thus, the boring tool can arrive at a considerable offset from the endpoint target of the bore plan.

A homing system, in contrast, relies on an electromagnetic signal that is emitted from the boring tool. The electromagnetic signal is received at a receiving position for generating homing commands that are used in guiding the boring tool to a target in relation to the receiving position. It should be appreciated that, in a homing system, numerical integration of orientation parameters of the boring tool is not necessary, therefore eliminating concerns with respect to accumulating positional offset errors. One example of an advanced homing system is represented by U.S. Pat. No. 6,727,704, which is commonly owned with the present application and hereby incorporated by reference. Applicants recognize, however, that the range of the electromagnetic signal from the boring tool to the receiving position can be significantly shorter than the length of an intended drill path.

Another form of prior art system for monitoring a boring tool uses what is often referred to as a walkover locator. In such a system, an operator carries the walkover locator above the surface of the ground for receiving the electromagnetic signal. The location of the boring tool can be established, at least in part, based on the ability of the operator to change the positional relationship between the walkover locator and the boring tool. In this way, various field-defined points can be identified at the surface of the ground which characterize the electromagnetic signal. Applicants recognize that in some instances the use of a walkover locator is impractical. For example, the drill path can extend under a busy highway, river, lake or other such obstacle.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a system includes a boring tool that is movable by a drill string having an extendable length that leads from the drill rig to the boring tool for performing a horizontal directional drilling operation that advances the boring tool through the ground. In one aspect of the disclosure, an apparatus and associated method are described for use in conjunction with the system including a transmitter supported by the boring tool for transmitting an electromagnetic homing signal. The transmitter includes a magnetometer for producing magnetic readings that characterize the magnetic field of the earth and an accelerometer for generating pitch readings that characterize a pitch orientation of the boring tool. A portable device is configured for monitoring the electromagnetic homing signal and for receiving the electromagnetic homing signal in a homing mode for use in generating homing commands to guide the boring tool to a target position in relation to the portable device. A processor is configured for generating steering commands for guiding the boring tool based on a bore plan in a steering mode using the magnetic readings, the pitch readings and the extendable length of the drill string such that at least some positional error is introduced between an actual position of the inground tool and a predicted location of the inground tool and for switching from the steering mode to the homing mode based at least in part on the monitoring of the electromagnetic homing signal as the boring tool approaches the portable device to, thereafter, guide the boring tool to the target position location in compensation for the positional error.

In another aspect of the disclosure, an apparatus and associated method are described for use in conjunction with the system including a transmitter supported by the boring tool for transmitting an electromagnetic homing signal. The transmitter includes a magnetometer for producing magnetic readings that characterize the magnetic field of the earth and an accelerometer for generating pitch readings that characterize a pitch orientation of the boring tool. A portable device includes an antenna configured for receiving the electromagnetic homing signal to generate electromagnetic information when the portable device is within a receiving range from the transmitter. A processing arrangement is configured for generating steering commands for guiding the boring tool based on a bore plan in a steering mode using the magnetic readings, the pitch readings and the extendable length of the drill string such that at least some positional error is introduced between an actual position of the inground tool and a predicted location of the inground tool and for guiding the boring tool to a target position relative to the portable device in a homing mode that compensates for the positional error when the portable device is within the receiving range.

In another aspect of the disclosure, an apparatus and associated method are described for use in conjunction with the system including a transmitter supported by the boring tool for transmitting an electromagnetic homing signal. The transmitter includes a magnetometer for producing magnetic readings that characterize the magnetic field of the earth and an accelerometer for generating pitch readings that characterize a pitch orientation of the boring tool. A portable device includes an antenna configured for receiving the electromagnetic homing signal to generate electromagnetic information when the portable device is within a receiving range from the transmitter. A processing arrangement is configured for generating steering commands for guiding the boring tool based on a bore plan in a steering mode using the magnetic readings, the pitch readings and the extendable length of the drill string such that at least some positional error is introduced between an actual position of the inground tool and a predicted location of the inground tool and for guiding the boring tool to return at least approximately to the bore plan in a homing mode that compensates for the positional error when the portable device is within the receiving range.

BRIEF DESCRIPTIONS OF THE DRAWINGS

Example embodiments are illustrated in referenced figures of the drawings. It is intended that the embodiments and figures disclosed herein are to be illustrative rather than limiting.

Figure 7A:
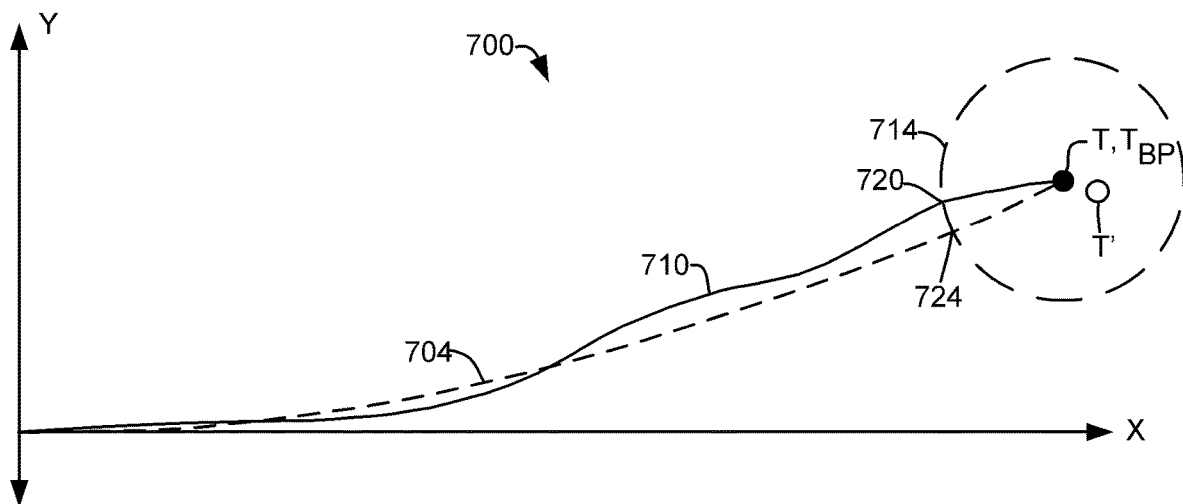

FIG. 7*a* is a diagrammatic illustration, in a plan view, showing a sample bore plan in relation to an actual drill path wherein an initial portion of the actual drill path is executed in a steering mode and a concluding portion of the actual drill path is concluded in a homing mode to reach a target position.

Figure 7B:
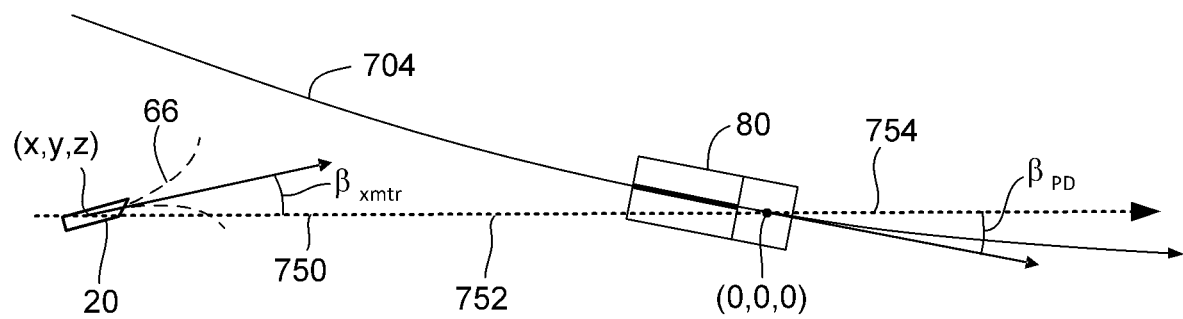

FIG. 7*b* is a diagrammatic plan view of an inground operation, showing a boring tool in relation to a portable device that is positioned on a bore plan.

Figure 7C:
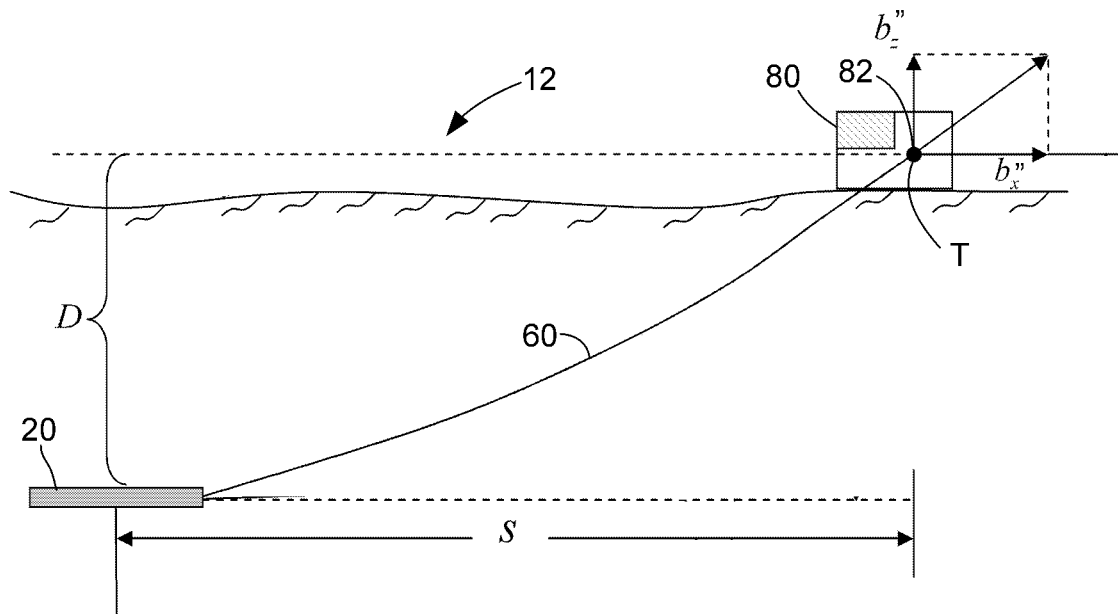

FIG. 7*c* is a diagrammatic view, in elevation, showing a boring tool in relation to a target, shown here to facilitate a discussion of identifying the position of the boring tool in relation to a portable device.

Figure 7D:
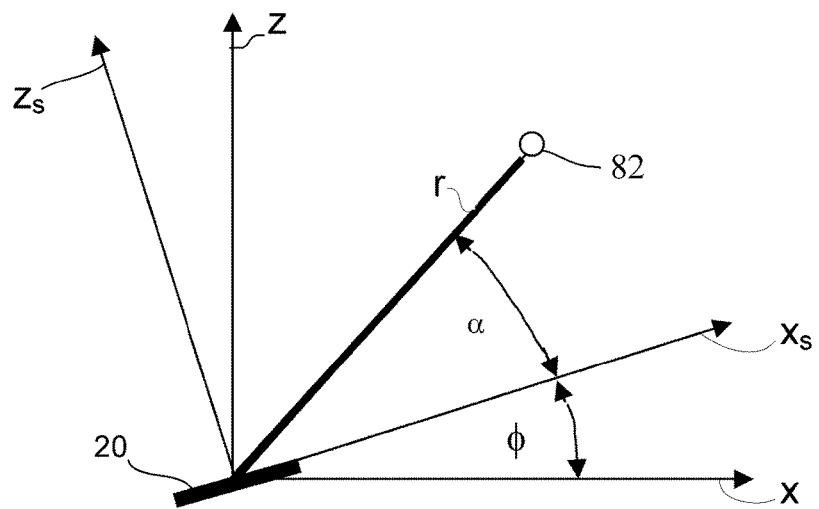

FIG. 7*d* is a diagrammatic illustration of additional orientation parameters supplemental to FIG. 7*c*.

Figure 7E:
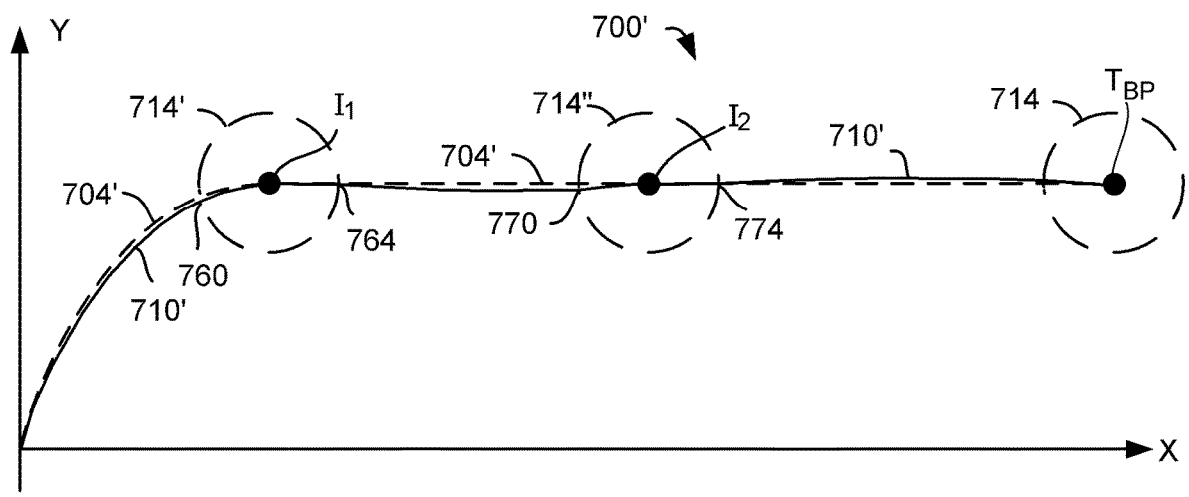

FIG. 7*e* is a diagrammatic plan view of a drilling operation showing intermediate targets that can be defined along the bore plan such that the system enters a homing mode to return the boring tool to the bore plan at each intermediate target to eliminate error that may have accumulated in a steering mode.

Figure 7F:
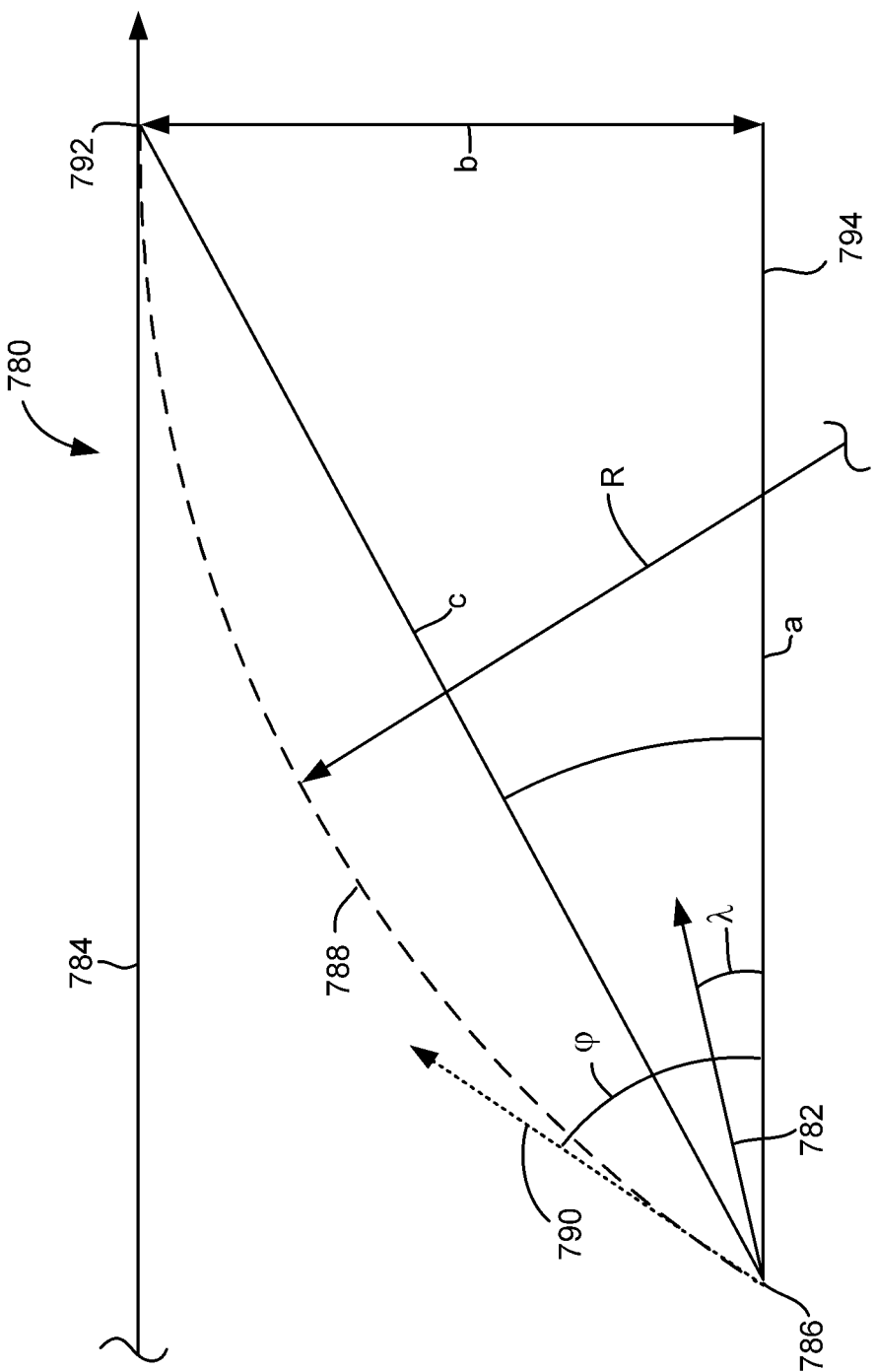

FIG. 7*f* is a diagrammatic illustration which can be either a plan view or an elevational view, illustrating returning a boring tool to a bore plan.

Figure 8:
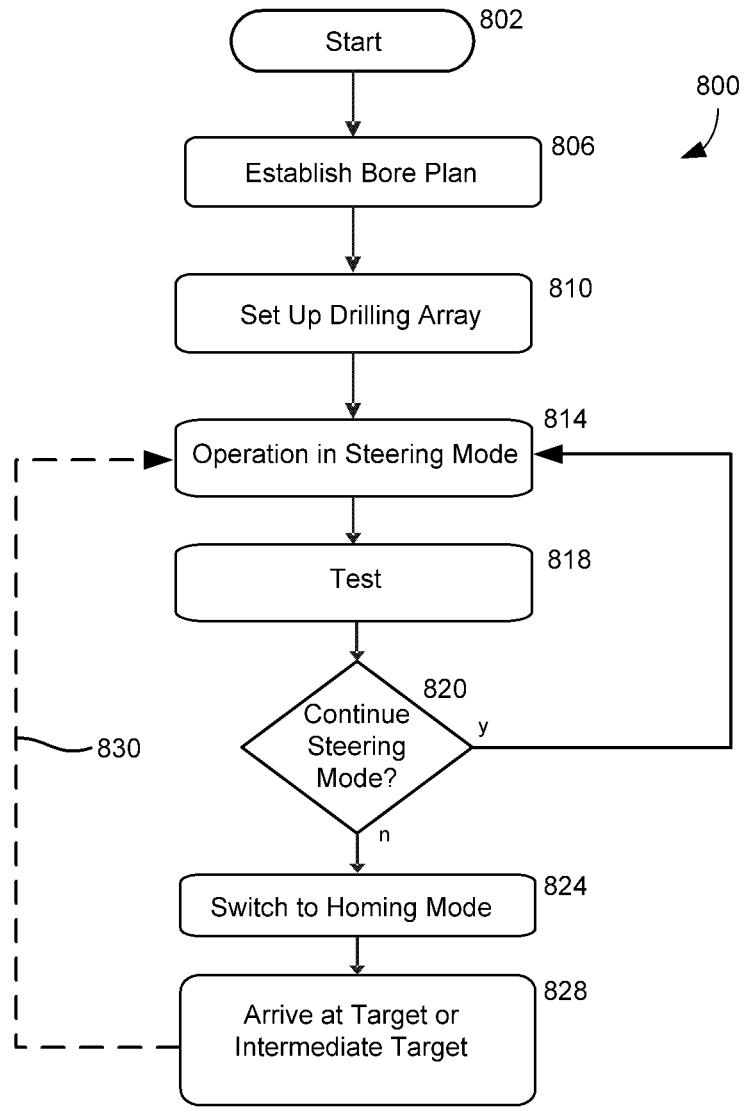

FIG. 8 is a flow diagram illustrating an embodiment of a method for the operation of the system of the present disclosure.

Figure 9:
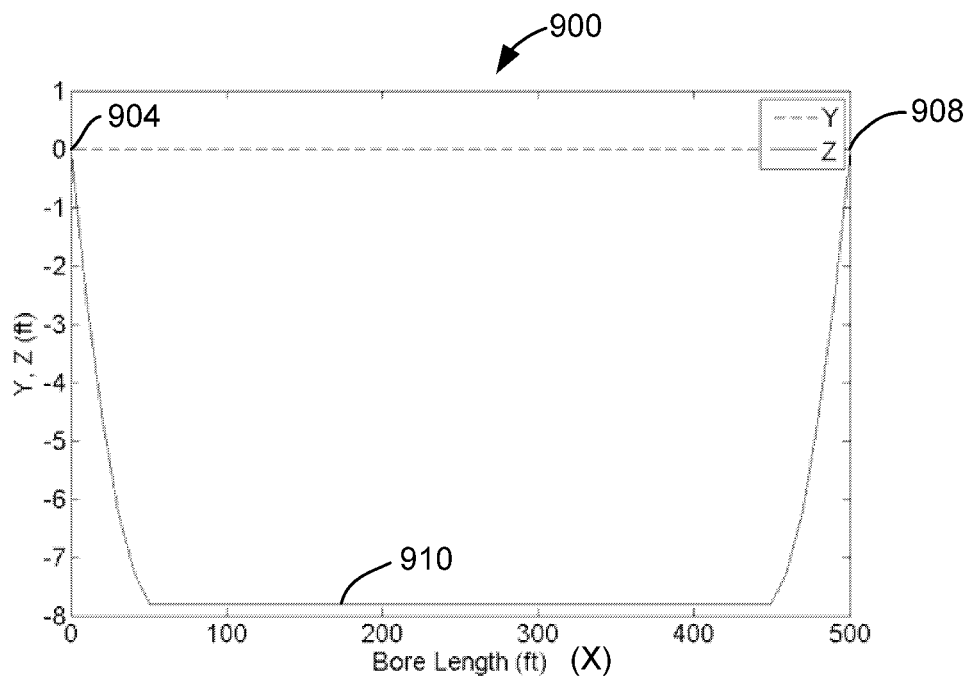
Figure 10:
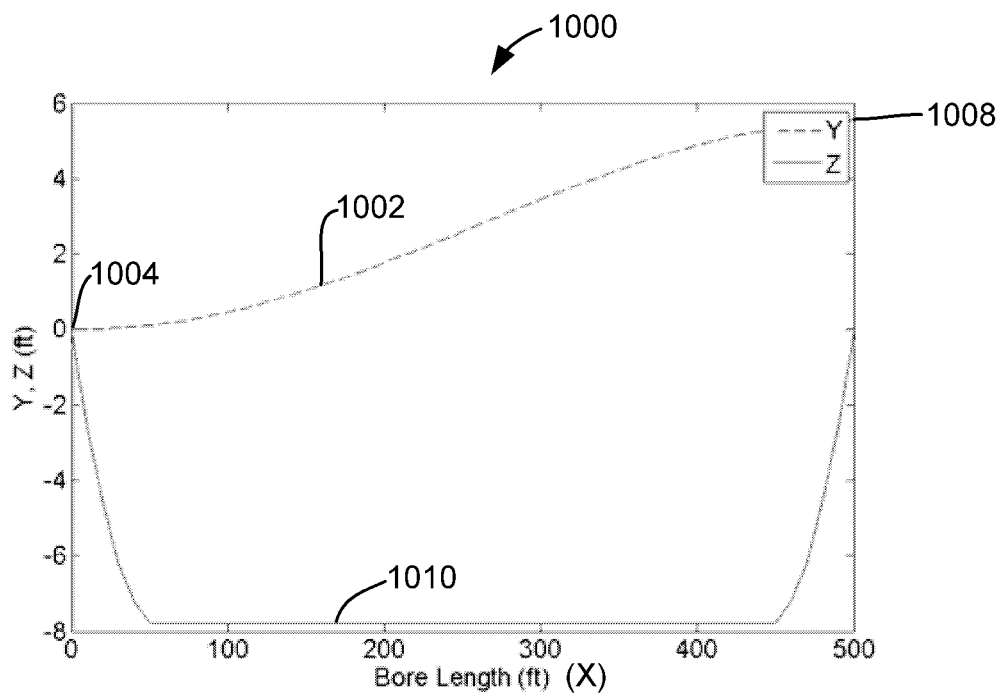
Figure 11:
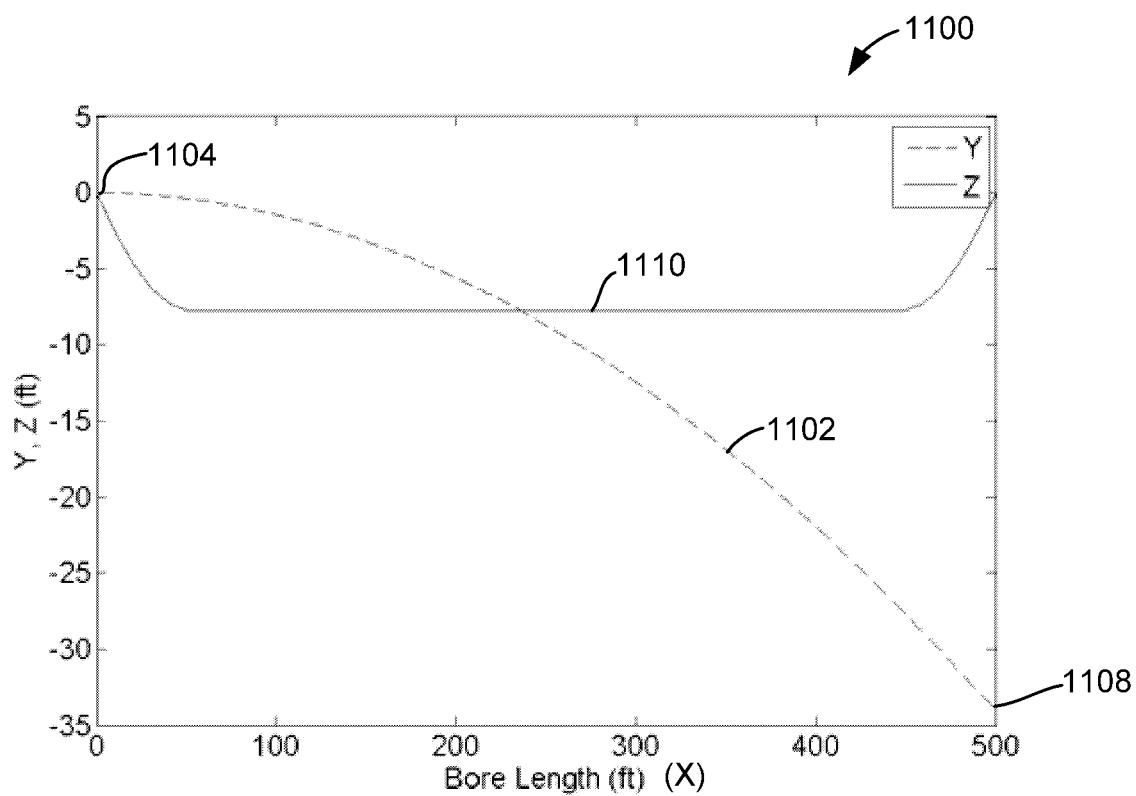

FIGS. 9-11 each illustrate a hypothetical bore plan for which numerical simulations were performed as a validation of the method of the present disclosure.

Figure 12:
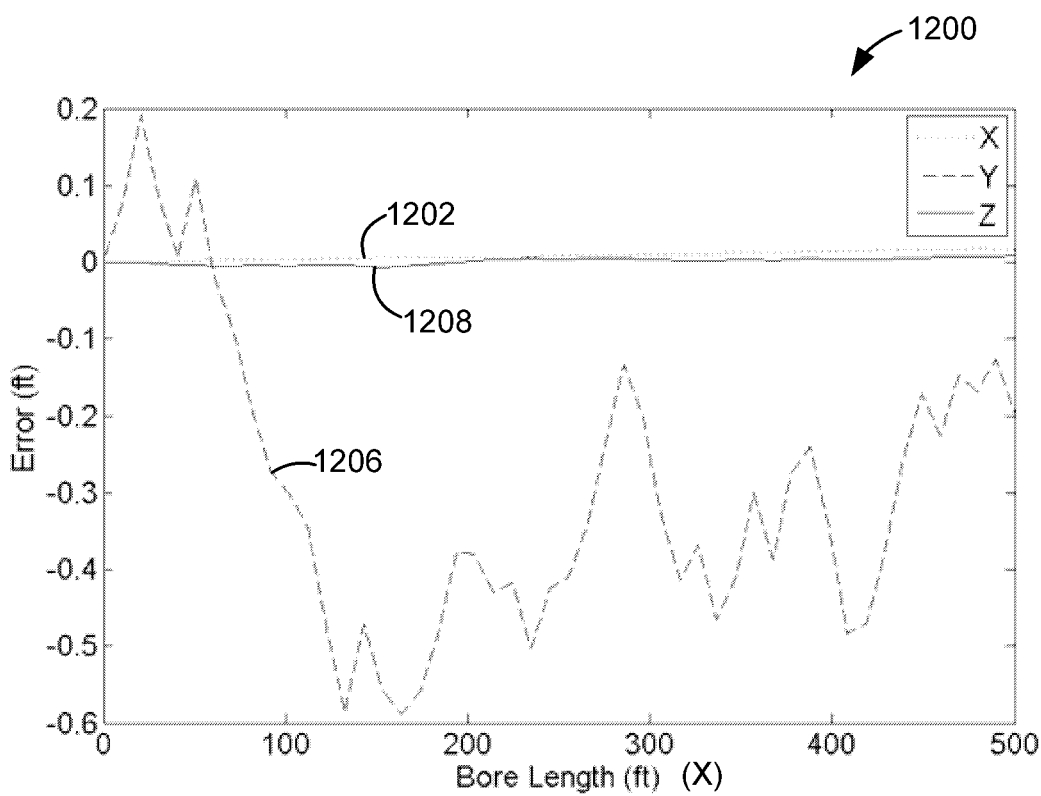

FIG. 12 is an example of a single simulation run, in the form of an error plot, for the straight bore plan of FIG. 9.

DETAILED DESCRIPTION

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting.

The present application brings to light a system, associated apparatus and methods that combine the convenience and functionality of a steering tool with that of a homing system. Applicants recognize that the exit location of a drill run can generally be conveniently accessed, however, that is not always the case for the entire length of the drill run such as, for example, when the drill run passes under a river. Accordingly, drilling under an obstacle, where conventional locating is not possible, can be performed in a steering mode. Thereafter, the bore run can be completed in a homing mode which complements the steering mode by providing compensation for accumulated positional error. During the steering and homing modes, irrespective of whether or not it is necessary to drill under/over and/or around an obstacle, drilling can proceed without the need for a skilled worker to operate a walkover locator for continuously locating the boring tool to provide steering information to the operator of the drill rig. That is, the present disclosure always presents guidance information directly to the operator of the drill rig. Accordingly, the opportunity for misinterpretation of walkover locator indicators by the walkover locator operator as well as miscommunication between the walkover locator operator and the drill rig operator are eliminated. The presentation of guidance information to the drill rig operator can be identical whether the system is operating in the steering mode or the homing mode. The transfer of sensor data and commands between the boring tool and the drill rig during the steering and homing modes can be facilitated through the use of the drill string as an electrical conductor, therefore conveniently streamlining system operation, as compared to conventional systems, including wire-in-pipe systems.

Figure 1:
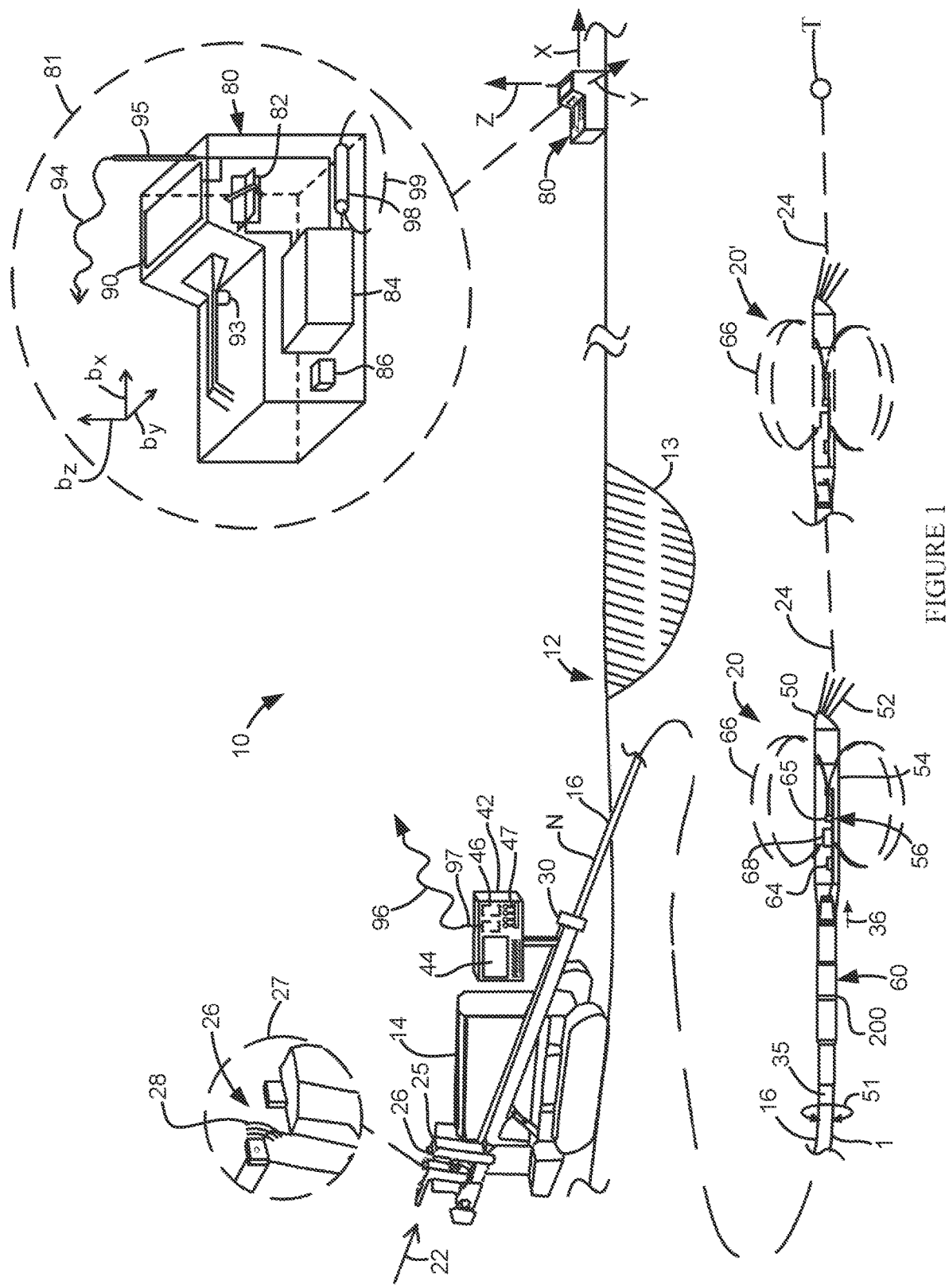
FIG. 1 is a diagrammatic view, in elevation, of a system which utilizes an embodiment of a multimode steering and homing system in accordance with the present disclosure.

Turning now to the figures wherein like components are indicated by like reference numbers throughout the various figures, attention is immediately directed to FIG. 1 which is an elevational view that diagrammatically illustrates an embodiment of a horizontal directional drilling system generally indicated by the reference number 10 and produced in accordance with the present disclosure. While the illustrated system shows the invention within the framework of a horizontal directional drilling system and its components for performing an inground boring operation, the invention can be adapted to other suitable applications by one of ordinary skill in the art while still applying the teachings that have been brought to light herein.

FIG. 1 illustrates system 10 operating in a region 12 within which an obstacle such as, for example, a river 13 is present. System 10 includes a drill rig 14 having a drill string 16 extending therefrom to a boring tool. The boring tool is shown at a first position operating in a steering mode indicated by the reference number 20 and, in phantom, at a second position operating in a homing mode, as indicated by the reference number 20'. The drill string can be pushed into the ground to move boring tool 20 at least generally in a forward direction 22 indicated by an arrow. System 10 can be configured for guiding the boring tool based on a bore plan 24 (two portions of which are shown using dashed lines) that can terminate at a target location $T_{BP}$. As will be further described, steering commands can be generated that are intended to guide the boring tool along bore plan 24. Such a bore plan is typically predetermined in advance of the actual horizontal directional drilling operation. The bore plan can be customized to accommodate any set of circumstances such as, for example, avoiding pre-existing utilities, structures, obstacles, and/or property boundaries. The bore plan can be established in any suitable manner. For example, based on obstacles such as river 13, an increase in depth can be necessitated. The bore plan can also account for an entry angle such as shown in FIG. 1 and an exit angle that can enter a pit or exit from the surface of the ground, based on the location of target $T_{BP}$. In a plan view of region 12, the bore plan can steer around obstacles such as, for example, boulders or structures. Other factors can play into the development of the bore plan including the physical limitations of the drilling equipment. These limitations include but are not limited to the tightest/minimum bend radius of the drill pipe sections that are in use.

With continuing reference to FIG. 1, drill string 16 is partially shown and is segmented, being made up of a plurality of removably attachable, individual drill pipe sections, two of which are indicated as 1 and N, having a section or segment length and a wall thickness. The drill pipe sections may be referred to interchangeably as drill rods having a rod length. During operation of the drill rig, one drill pipe section at a time can be added to the drill string and pushed into the ground by the drill rig using a movable carriage 25 in order to advance the inground tool. Drill rig 14 can include a suitable monitoring arrangement 26 for measuring movement of the drill string into the ground such as is described, for example, in U.S. Pat. No. 6,035,951 (hereinafter the '951 patent), entitled SYSTEMS, ARRANGEMENTS AND ASSOCIATED METHODS FOR TRACKING AND/OR GUIDING AN UNDERGROUND BORING TOOL, which is commonly owned with the present application and hereby incorporated by reference. Monitoring arrangement 26 is also shown in a further enlarged inset view 27 within a dashed circle. The movement arrangement, for example, can transmit ultrasonic energy 28 from a transmitter to a receiver for tracking the motion of the carriage and this information can be used in conjunction with the status of a drill string clamp 30 to determine which motions of the carriage contribute to advancing the boring tool. For example, a motion of the carriage in direction 22, while drill string clamp 30 is unclamped, serves to extend the drill string.

Each drill pipe section defines a through opening 35 (one of which is indicated) extending between opposing ends of the pipe section. The drill pipe sections can be fitted with what are commonly referred to as box and pin fittings such that each end of a given drill pipe section can threadingly engage an adjacent end of another drill pipe section in the drill string in a well-known manner. Once the drill pipe sections are engaged to make up the drill string, the through openings of adjacent ones of the drill pipe sections align to form an overall pathway 36 that is indicated by an arrow. Pathway 36 can provide for a pressurized flow of drilling fluid or mud, consistent with the direction of the arrow, from the drill rig to the drill head, as will be further described.

The location of the boring tool within region 12 as well as the underground path followed by the boring tool can be established and displayed at drill rig 14, for example, on a console 42 using a display 44. The console can include a processing arrangement 46 and a control actuator arrangement 47. In some embodiments, control and monitoring of operational parameters can be automated.

Boring tool 20 can include a drill head 50 having an angled face for use in steering based on roll orientation. That is, the drill head when pushed ahead without rotation will generally be deflected on the basis of the roll orientation of its angled face. On the other hand, the drill head can generally be caused to travel in a straight line by rotating the drill string as it is pushed, as indicated by a double-headed arrow 51. Of course, predictable steering is premised upon suitable soil conditions. It is noted that the aforementioned drilling fluid can be emitted as jets 52 under high pressure for purposes of cutting through the ground immediately in front of the drill head, carrying cuttings to the surface and to provide for cooling and lubrication of the drill head. Boring tool 20 includes an inground housing 54 that receives an electronics package 56. The inground housing is configured to provide for the flow of drilling fluid to drill head 50 around the electronics package. For example, the electronics package can include a cylindrical housing configuration that is supported in a centered manner within housing 54. Drill head 50 can include a box fitting that receives a pin fitting of inground housing 54. An opposing end of the inground housing can include a box fitting that receives a pin fitting of an isolator 60 which forms an electrically isolated gap or break between its opposing ends. The other end of isolator 60 can include a box fitting that receives a pin fitting from drill rod 1. Inground electronics package 56 can include a drill string transceiver 64 and a homing transceiver 65. Further details with respect to the drill string transceiver will be provided at appropriate points hereinafter. Homing transceiver 65, in some embodiments, can transmit a ground penetrating signal 66 such as, for example, a dipole locating signal and can receive an electromagnetic signal that is generated by other components, as will be described at an appropriate point below. The present example assumes that electromagnetic signal 66 is a homing signal in the form of a dipole signal for descriptive purposes. Accordingly, electromagnetic signal 66 may be referred to as a homing signal. It should be appreciated that the homing signal can be modulated like any other electromagnetic signal and that the modulation data is thereafter recoverable from the signal. The functionality of the signal for use in generating homing commands, yet to be described, depends on the characteristic shape of the flux field and its signal strength rather than its ability to carry modulation. Thus, modulation is not required. Information regarding certain parameters of the boring tool such as, for example, pitch and roll (orientation parameters), temperature, drilling fluid pressure and annular pressure surrounding the boring tool can be measured by a suitable sensor arrangement 68 located within the boring tool which may include, for example, a pitch sensor, a roll sensor, a temperature sensor, an AC field sensor for sensing proximity of 50/60 Hz utility lines and any other sensors that are desired such as, for example, a DC magnetic field sensor for sensing yaw orientation (a tri-axial magnetometer, with a three axis accelerometer to form an electronic compass to measure yaw orientation) and one or more pressure sensors. It is noted that pitch and roll orientation can be obtained based on the outputs of a tri-axial accelerometer. Any suitable combination of this information can be modulated onto signal 66 and/or transmitted to the drill rig by drill string transceiver 64 via isolator 60, using the drill string as an electrical conductor. Drill string transceiver 64 can include a processor that is interfaced as necessary with sensor arrangement 68 and homing transceiver 65. A battery (not shown) can be provided within the housing for providing electrical power.

A portable device 80 is shown positioned on the surface of the ground and in a further enlarged inset view 81 within a dashed circle. It is noted that inter-component cabling within device 80 has been only partially illustrated in order to maintain illustrative clarity, but is understood to be present and may readily be implemented by one having ordinary skill in the art in view of this overall disclosure. The portable device can be used to detect electromagnetic signal 66. An embodiment of a suitable and highly advanced portable receiver is described in above incorporated U.S. Pat. No. 6,727,704. The portable device includes a three-axis antenna cluster 82 measuring three orthogonally arranged components of electromagnetic flux indicated as $b_x$, $b_y$ and $b_z$ responsive to electromagnetic signal 66. One useful antenna cluster contemplated for use herein is disclosed by U.S. Pat. No. 6,005,532 which is commonly owned with the present application and is incorporated herein by reference. Antenna cluster 82 is electrically connected to an electronics package 84. The electronics package can include components such as, for example, one or more processors, memory of any appropriate type and analog to digital converters. As is well known in the art, the latter should be capable of detecting a frequency that is at least twice the frequency of the highest frequency of interest. A tilt sensor arrangement 86 may be provided for measuring gravitational angles from which the components of flux in a level coordinate system may be determined. In an embodiment, the tilt sensor arrangement can include a tri-axial accelerometer. Device 80 can further include a graphics display 90. It should be appreciated that graphics display 90 can be a touch screen in order to facilitate operator selection of various buttons that are defined on the screen and/or scrolling can be facilitated on the screen to provide for operator selection. Such a touch screen can be used alone or in combination with an input device 93 such as, for example, a trigger for purposes of selection functionality. The input device can be used without the need for a touch screen. Moreover, many variations of the input device may be employed and can use scroll wheels and other suitable well-known forms of selection devices. Any parameter of interest in relation to drilling such as, for example, pitch may be displayed on display 44 and/or on display 90 as recovered from the boring tool. Device 80 can transmit and/or receive a telemetry signal 94 using an antenna 95, while drill rig 14 can transmit and/or receive a telemetry signal 96 using an antenna 97. These telemetry components can provide for bidirectional signaling between the drill rig and device 80, although this is not required. In an embodiment, an antenna 98 can be provided in device 80 for transmitting a signal 99 to the boring tool to facilitate the transfer of information that is generated by device 80, as will be further described. Other components (not shown) may be added to device 80 as desired such as, for example, a magnetometer to aid in position determination relative to the drill direction and ultrasonic transducers for measuring the height of the device above the surface of the ground.

Attention is now directed to details with respect to inground isolator 60 of FIG. 1. Generally, the isolator forms an electrically isolated gap 200 such that the drill string transceiver is electrically coupled across the gap to utilize the drill string as an electrical conductor for bidirectional communication with the drill rig. Advanced embodiments for providing an electrically isolated gap are disclosed are in U.S. Published Patent Application nos. 2014-0055278 and 2014-0262513, each of which is commonly owned with the present application and each of which is hereby incorporated herein by reference. In another embodiment, the use of the drill string as an electrical conductor can be facilitated through the use of a current transformer as described, for example, in U.S. Pat. No. 8,695,727 and U.S. Published Patent Application no. 2012-0218863 each of which is commonly owned with the present application and each of which is hereby incorporated herein by reference.

Figure 2:
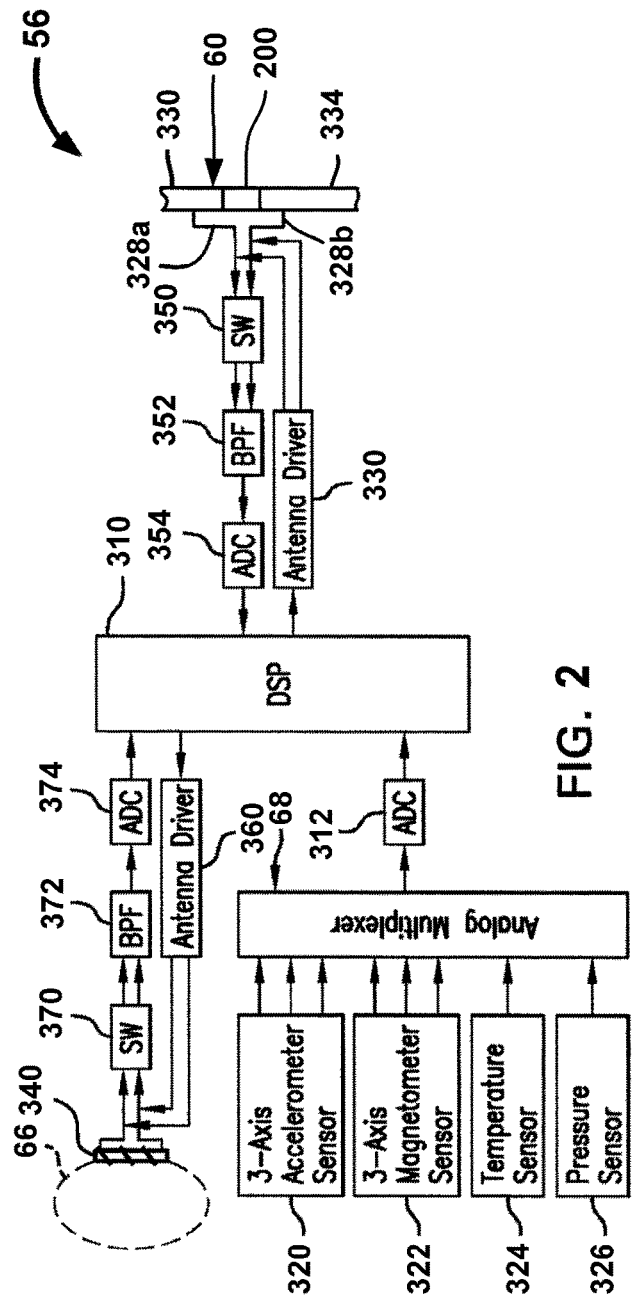
FIG. 2 is a block diagram illustrating an embodiment of an electronics package that can be carried by a boring tool.

FIG. 2 is a block diagram which illustrates an embodiment of electronics package 56 in further detail. Package 56 can include an inground digital signal processor 310 which can facilitate all of the functionality of drill string transceiver 64 and homing transceiver 65 of FIG. 1. Sensor section 68 can be electrically connected to digital signal processor 310 via an analog to digital converter (ADC) 312. Any suitable combination of sensors can be provided for a given application and can be selected, for example, from an accelerometer 320, a magnetometer 322, a temperature sensor 324 and a pressure sensor 326 which can sense the pressure of drilling fluid prior to being emitted from the drill string and/or within the annular region surrounding the downhole portion of the drill string. Adapter/Isolator 60 is diagrammatically shown as separating an uphole portion 330 of the drill string from a downhole portion 334 of the drill string for use in one or both of a transmit mode, in which data is coupled onto the drill string, and a receive mode in which data is recovered from the drill string. The electronics package is connected, as illustrated, across electrically insulating/isolating break 200 formed by the isolator by a first lead 328a and a second lead 328b which can be referred to collectively by the reference number 328. In an embodiment using a current transformer, these leads can be connected to the current transformer leads. For the transmit mode, an antenna driver section 330 is used which is electrically connected between inground digital signal processor 310 and leads 328 to drive the drill string. In an embodiment, the data that can be coupled into the drill string can be modulated using a frequency that is different from any frequency that is used to drive a dipole antenna 340 that can emit aforedescribed signal 66 (FIG. 1) in order to avoid interference, although this is not required. When antenna driver 330 is off, an On/Off Switcher (SW) 350 can selectively connect leads 328 to a band pass filter (BPF) 352 having a pass band that contains the frequency of the data signal that is received from the drill string. BPF 352 is, in turn, connected to an analog to digital converter (ADC) 354 which is itself connected to digital signal processing section 310. Recovery of the modulated data in the digital signal processing section can be readily configured by one having ordinary skill in the art in view of the particular form of modulation that is employed.

Still referring to FIG. 2, dipole antenna 340 can be connected for use in one or both of a transmit mode, in which signal 66 is transmitted into the surrounding earth, and a receive mode in which an electromagnetic signal such as, for example, signal 99 of FIG. 1 is received. For the transmit mode, an antenna driver section 360 is used which is electrically connected between inground digital signal processor 310 and dipole antenna 340 to drive the antenna. When antenna driver 360 is off, an On/Off Switcher (SW) 370 can selectively connect dipole antenna 340 to a band pass filter (BPF) 372 having a pass band that contains the frequency of the data signal that is received from the dipole antenna. BPF 372 is, in turn, connected to an analog to digital converter (ADC) 374 which is itself connected to digital signal processing section 310. Transceiver electronics for the digital signal processing section can be readily configured in many suitable embodiments by one having ordinary skill in the art in view of the particular form or forms of modulation employed and in view of this overall disclosure. The design shown in FIG. 2 can be modified in any suitable manner in view of the teachings that have been brought to light herein.

Figure 3:
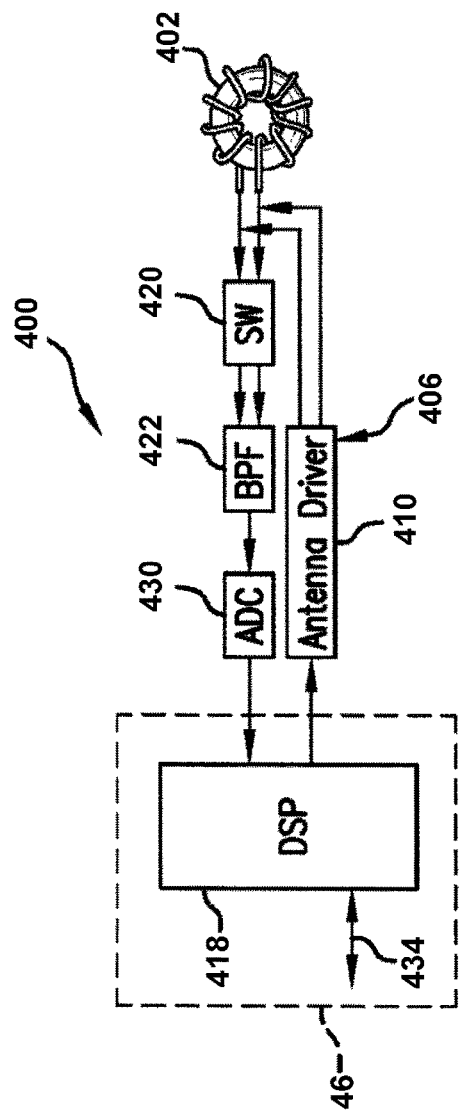
FIG. 3 is a block diagram of components that can make up an embodiment of an aboveground transceiver arrangement that can be located at the drill rig.

Referring to FIGS. 1 and 3, the latter is a block diagram of components that can make up an embodiment of an aboveground transceiver arrangement, generally indicated by the reference number 400, that is coupled to drill string 16 at the drill rig. An aboveground current transformer 402 is positioned, for example, on drill rig 14 for coupling and/or recovering signals to and/or from drill string 16. Current transformer 402 can also be replaced by two electrical leads, one connected to the drill string and one connected to the Earth ground. Current transformer 402 can be electrically connected for use in one or both of a transmit mode, in which data is modulated onto the drill string, and a receive mode in which modulated data is recovered from the drill string. A transceiver electronics package 406 is connected to the current transformer and can be battery powered or powered by the drill rig such that an essentially unlimited amount of electrical power is available. For the transmit mode, an antenna driver section 410 is used which is electrically connected between an aboveground digital signal processor 418 and current transformer 402 to drive the current transformer. Again, in an embodiment, the data that can be coupled into the drill string can be modulated using a frequency that is different from the frequency that is used to drive dipole antenna 340 (FIG. 6) in order to avoid interference as well as being different from the frequency at which isolator 60 drives a signal onto the inground end of the drill string, although this is not required. When antenna driver 410 is off, an On/Off Switcher (SW) 420 can selectively connect current transformer 402 to a band pass filter (BPF) 422 having a pass band that contains the frequency of the data signal that is received from the drill string. BPF 422 is, in turn, connected to an analog to digital converter (ADC) 430 which is itself connected to digital signal processing section 418. It should be appreciated that digital signal processing section 418 and related components, which comprise an uphole transceiver, can form part of processing arrangement 46 (shown using a dashed line) of the drill rig or can be connected thereto on a suitable interface 434. Transceiver 406 can send commands to the boring tool for a variety of purposes such as, for example, to control transmission power, select a carrier frequency, change data format (e.g., lower the baud rate to increase decoding range) and the like. Transceiver electronics for the aboveground transceiver arrangement can be readily configured in many suitable embodiments by one having ordinary skill in the art in view of the particular form or forms of modulation employed and in view of this overall disclosure.

Figure 4:
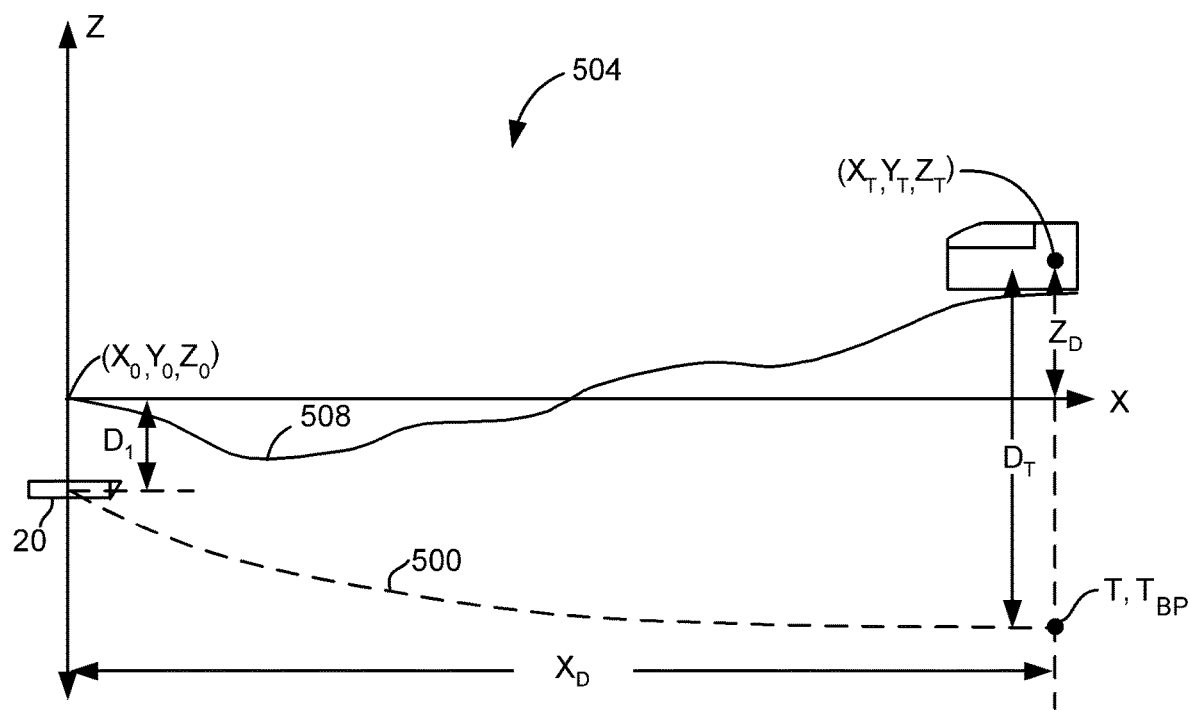
FIGS. 4 and 5 are diagrammatic illustrations of a bore plan in an elevational view and a plan view, respectively, shown here to illustrate start and target positions in conjunction with additional parameters.
Figure 5:
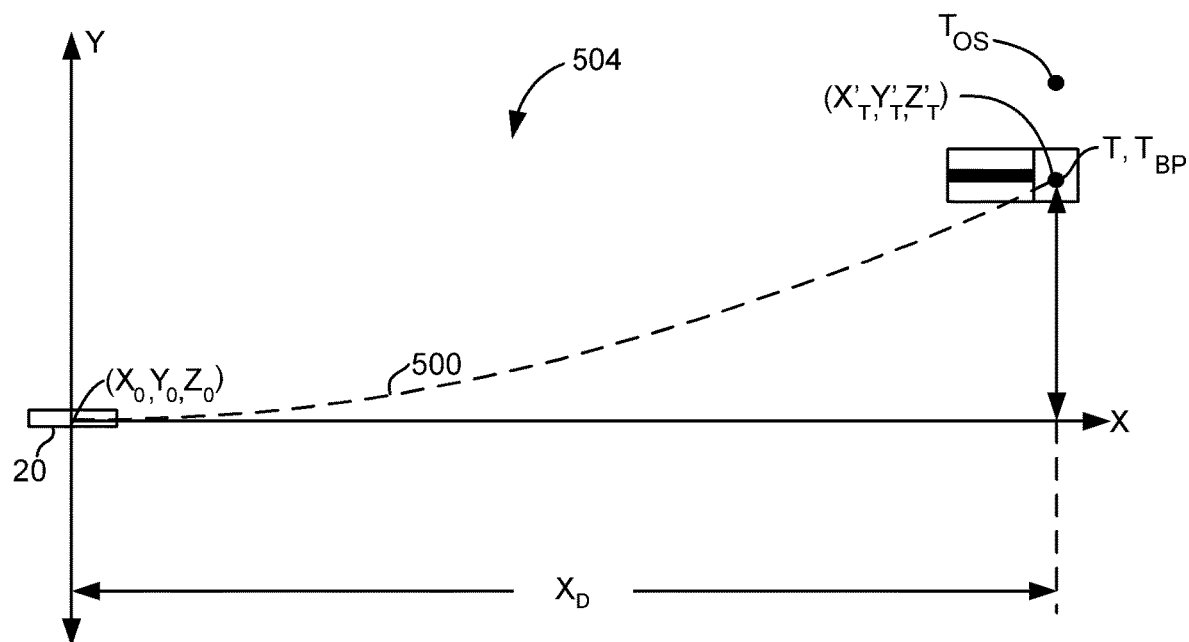

Referring to FIGS. 4 and 5, the former is a diagrammatic view, in elevation, of a bore plan 500 in the X-Z (vertical) plane of a region 504 that extends from a start position to target location $T_{BP}$, which is the terminus of the bore plan, thereby illustrating depth along an intended path, while the latter is a diagrammatic plan view of bore plan 500 in the X-Y (horizontal) plane of region 504, thereby illustrating the lateral (i.e., left/right) characteristics of the intended path. For purposes of the present example, it is assumed that portable device 80 is physically positioned and set up such that a target position T is coincident with target location $T_{BP}$, at the end of the bore plan, although this is not a requirement. In this regard, target position T can be offset vertically and/or horizontally from $T_{BP}$. In the steering mode, steering commands are generated to guide the boring tool to target location $T_{BP}$. In contrast, in the homing mode, homing commands are generated based on electromagnetic signal 66 to cause the boring tool to approach or home in on target position T. Obstacles may be present at least along an initial portion of the bore plan but have not been shown for purposes of maintaining illustrative clarity. It is noted that FIGS. 4 and 5 are shown in vertical alignment for purposes of illustrative clarity. While the present description is framed in terms of the use of a bore plan, it should be understood that system 10 can be operated with or without a predefined/predetermined bore plan. In view of FIGS. 4 and 5, it should be clear that the bore plan is not confined to the X-Z plane and that drilling along a curved path can be performed. If there is no predetermined bore plan, the operator can provide the desired bore depth and the system can determine the bore path essentially on-the-fly, for example, including an entry profile, a main bore path at the desired bore depth and an exit profile. The origin of the X-Y-Z coordinate system can be located on a surface 508 of the ground above the center of the transmitter and can be defined as $(X_0, Y_0, Z_0)$. Prior to beginning, the operator can place portable device 80 on the ground in relation to target position T and ahead of the transmitter with the $b_x$ axis of antenna 82 (FIG. 1) pointing at least generally in the drilling direction. In one embodiment of an initial drilling set-up, the Z coordinate axis can extend vertically through the center of transmitter 20 at the start position. The elongation axis of the transmitter, about which the transmitter rolls, represents the yaw orientation of the transmitter, subject to pitch, and can be used to establish the horizontal X axis at the surface of the ground. That is, the elongation axis of the transmitter and the X axis are at least coplanar in the plan view of FIG. 5. The Y axis is orthogonal to both the X and Y axes. The transmitter depth at the start position, which can be measured directly, is identified as $D_1$ (FIG. 4), where the drilling operation begins. It is noted that $D_1$ can be zero such that the transmitter start position is at the surface of the ground. Hence, an initial position of the transmitter becomes:

$$(X_1, Y_1, Z_1) = (0, 0, -D_1) \tag{1}$$

The target position T is defined relative to the location of the portable device. T may be the location of the portable device itself, or a position that is offset below and laterally offset or a combination of depth and lateral offset with respect to the portable device. In the former case, target position T may be identified as $(X_T, Y_T, Z_T)$ if the center of tri-axial antenna 80 (FIG. 1) of the portable device is chosen as target T. In the latter case, if the target position is offset directly below device 80 at a depth $D_T$, as shown, the offset target position T may be designated as $(X'_T, Y'_T, Z'_T)$ such that:

$$(X'_T, Y'_T, Z'_T) = (X_D, Y_D, (Z_D - D_T)) \tag{2}$$

Where the subscript D designates a parameter relating to the portable device and the value $D_T$ designates the depth of the target including a distance $Z_D$ of the portable device above the surface of the ground. Alternatively, if the target position is offset laterally with respect to device 80 the target position can be designated as $T_{OS}$ having coordinates $(X_{OS}, Y_{OS}, Z_{OS})$. During drilling, the pitch orientation (i.e., the angle between the horizontal X-Y plane and the Z axis) can be measured based on accelerometer readings and the yaw orientation (angle in the horizontal plane usually with reference to the X axis) of the transmitter are measured by magnetometer 322 (FIG. 2). Magnetometer readings with respect to magnetic North can readily be converted to reference the X axis. Further, portable device 80 can measure the electromagnetic flux from signal 66 using antenna 82 so long as the transmitter is within range of the portable device. For purposes of the present example, it will be assumed that an overall length $X_D$ of the bore plan is 200 feet and that the signal 66 can be received by portable device 20 so long as the transmitter is within 40 feet from the portable device. While transmitter 20 is too far from the locator to receive sufficiently accurate measurements of the flux from signal 66, system 10 operates in a steering mode using pitch and yaw readings in conjunction with drill string extension/length to determine the estimated bore path. By way of non-limiting example, the drill rod length is used in the present embodiment as a drilling increment between pitch and yaw measurement positions. Any suitable increment, however, can be used between measurement positions as measured, for example, by drill string monitoring arrangement 26 of FIG. 1. Accordingly, with the uphole end of the $N^{th}$ drill rod pushed into the ground, the estimated transmitter location is:

$$X_N = X_{N-1} + L_R * \cos(\phi_{N-1}) * \cos(\beta_{N-1}) \tag{3a}$$

$$Y_N = Y_{N-1} + L_R * \cos(\phi_{N-1}) * \sin(\beta_{N-1}) \tag{3b}$$

$$Z_N = Z_{N-1} + L_R * \sin(\phi_{N-1}) \tag{3c}$$

Where $L_R$ is the average rod length, $\phi$ is the pitch orientation of the transmitter, and $\beta$ is the yaw orientation of the transmitter.

Figure 6:
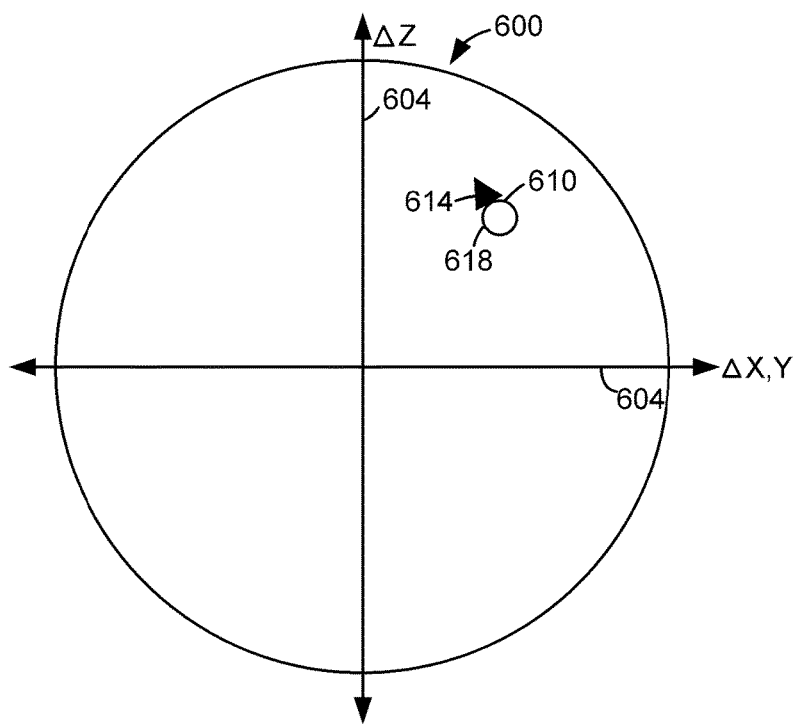
FIG. 6 is a diagrammatic view of an embodiment of the appearance of a display for purposes of presenting steering mode and homing mode guidance to an operator.

Attention is now directed to FIG. 6 which is a screen shot, generally indicated by the reference number 600, that diagrammatically represents an embodiment of the appearance of display 44 and/or display 90 (FIG. 1) for providing steering guidance to the operator. Guidance parameters $\Delta(X,Y)$ on the horizontal axis and $\Delta Z$ on the vertical axis can be determined to indicate which direction to steer. Such steering guidance can be determined based on how far the estimated transmitter location, from Equations 3a-3c, is from the bore plan, and displaying that guidance as indicated in FIG. 6. As an example, for a given length of the drill string corresponding to a given X coordinate value for the position of the transmitter, the X,Y,Z position on the bore plan can be determined and compared to the position determined based on Equations 3a-3c. In the figure, crosshairs 604 indicate the desired direction of the boring tool, at its current position relative to the intended bore path, while a steering indicator 610 represents the difference between the actual direction of the boring tool and the desired direction. A triangle 614 indicates the current roll position of the boring tool while a ball 618 indicates the position of the boring tool relative to the bore plan. The distance of the ball from the center of crosshairs 604 indicates how far off the current direction of the boring tool is from the desired direction, with the desired direction being based on the desired path from the current position back to the bore plan. For example, if ball 618 is in the upper right quadrant, as shown, steering should be down and to the left. This can be accomplished by pushing on the drill string to advance the boring tool with triangle 614 pointing at the center of crosshairs 604. As an example, current pitch and yaw are $\phi_{current}$ and $\beta_{current}$, respectively, and the desired pitch and yaw to return to the planned bore path $\phi_{desired}$ and $\beta_{desired}$, respectively. The desired direction can be determined in a suitable manner, for example, by turning at the minimum bend radius of the pipe or by reaching the planned bore path in a given distance from the current location. Achieving the desired direction then requires a change in yaw and pitch of $\Delta\beta = \beta_{desired} - \beta_{current}$ and $\Delta\phi = \phi_{desired} - \phi_{current}$, respectively. In this case, the position of ball 618 with respect to the center of the crosshairs is given by:

$$\Delta(X,Y) = \Delta\beta / \Delta\theta_{max} \tag{4a}$$

$$\Delta Z = \Delta\phi / \Delta\theta_{max} \tag{4b}$$

$$\text{where } \Delta\theta_{max} = L_{rod} / R_{min} \tag{4c}$$

In Equations (4a), $\Delta(X,Y)$ is the horizontal guidance command. In Equation 4b, $\Delta Z$ is the vertical guidance command. In Equation 4c, $L_{rod}$ is the rod length and $R_{min}$ is the minimum bend radius of the drill pipe.

Returning to the discussion of Equations (3a-3c), these equations are the discrete equivalent to integration such that errors in pitch and yaw measurements result in accumulated positional error. Since there is no measurement of true or actual position while operating strictly in the steering mode, corrections to account for the accumulated positional error cannot be made. However, when the transmitter is within range of portable device 80, the latter defines an absolute position such that the system can switch to the homing mode to guide the transmitter to the target position whether the target position is the center of antenna 82 or offset therefrom, as will be described immediately hereinafter.

Referring to FIG. 7a, a region 700 is shown in a plan view of the X-Y plane including an example of a predetermined bore plan 704, shown as a dashed line. The bore plan can lead to target position $T_{BP}$ which is the end point or terminus of the bore plan An actual path 710 taken by the boring tool is indicated using a solid line. It should be appreciated that deviation of actual path 710 from bore plan 704 is indicative of positional error that can be cumulative, thereby causing the actual path to deviate to either side of the bore plan. Assuming by way of non-limiting example, that target position T is directly below portable device 80 and coincides with end point $T_{BP}$ of the bore plan, a dashed circle 714 designates the range at which electromagnetic signal 66 (FIG. 1) can be received by the portable device as the boring tool approaches along the actual drill path. While a circular receiving region is illustrated in the plan view of the figure, corresponding to a spherical region in three dimensions, one of ordinary skill in the art will appreciate that the shape of this region can vary based, for example, on local geography surrounding the target. It is noted that accumulated error at a point 720 on the actual drill path is represented as an offset distance from a point 724 on the bore plan. In an embodiment, the system can switch from the steering mode to the homing mode at point 720. From point 720 onward, the actual path then converges on target position T as defined relative to the physical location of portable device 80. In FIG. 7a, it is assumed that target location $T_{BP}$ at the terminus of the bore plan coincides with the homing target position T that is defined relative to the portable device, however, this is not a requirement. It should be appreciated that the system can compensate for offsets of target location $T_{BP}$ with respect to the homing target position T as defined by the portable device. That is, once the boring tool is within the receiving range illustrated by circle 714 and the system is operating in the homing mode, the drill path can conclude based solely on the physical location of the portable device. For example, a homing target T' can be offset from target location $T_{BP}$, anywhere within the receiving range 714 illustrated as a circle, provided that the orientation of the portable device with respect to the bore plan is known, as will be further discussed below.

Referring to FIG. 7b, portable device 80 and boring tool 20 are shown in a diagrammatic plan view during an inground operation for purposes of describing the determination of the position of the boring tool relative to the portable device and, thereby, relative to a bore plan. Assume that portable device 80 is at position (0,0,0) and that the device is aligned with bore plan 704, with a yaw of $\beta_{PD}$ with respect to an X axis 750 of a suitable coordinate system (shown by a dotted line). The boring tool is at position (x,y,z), relative to the portable device, with a yaw of $\beta_{xmtr}$ with respect to X axis 750. The magnetic field components measured by the locator along its three orthogonal axes are ($b_x$, $b_y$, $b_z$), as shown in FIG. 1. Given that the angular orientations of both the portable device and the boring tool are known, the position (x,y,z) of the boring tool can be determined relative to the portable device. To this end, the electromagnetic flux components of electromagnetic homing signal 66 are subjected to two rotational transformations to establish the orthogonal electromagnetic flux components that would be seen by portable device 80 if it were at the same angular orientation as the boring tool. The first rotation is a yaw rotation to rotate the flux components to those which would be received if the yaw axis of the portable device was at the same yaw angle as the boring tool and its associated transmitter, $\beta_{xmtr}$. Accordingly, the flux components are first rotated about the Z axis of the coordinate system (i.e., extending outward perpendicular to the plane of the figure), corresponding to the difference between $\beta_{PD}$ and $\beta_{xmtr}$. For this purpose, a rotation matrix R(ax,ang) is defined that generates a rotation by the angle "ang" about the axis "ax". The transformed or projected magnetic field components that would be measured by the portable device after this first transformation are given by:

$$(b_x', b_y', b_z') = R(Z, \beta_{PD} - \beta_{xmtr}) * (b_x, b_y, b_z) \quad (5)$$

Subsequent to the rotation of Equation 5, a second rotation about the X axis rotates the flux components by an angle $\delta$ until the magnetic field component seen by the Y antenna of the portable device is equal to zero, as given by:

$$(b_x'', 0, b_z'') = R(X, \delta) * (b_x', b_y', b_z') \quad (6a)$$

$$\delta = \tan^{-1}(b_z'/b_y') \quad (6b)$$

Where $b_x''$ and $b_z''$ are the transformed or projected flux components subject to the second rotation.

Referring now to FIG. 7c, a diagrammatic view, in elevation, illustrates boring tool 20 in relation to portable device 80. After performing the two rotational transformations, the rotated flux intensity components $b_x''$ and $b_z''$ can be used to determine a horizontal distance S between the portable device and the boring tool and a depth D of the boring tool.

The transmitter depth D and horizontal distance S from the antenna of the portable device to the transmitter are determined using Equations (7a-7f), as follows:

$$D = r\sin(\alpha + \phi) \quad (7a)$$

$$S = r\cos(\alpha + \phi) \quad (7b)$$

$$b_{x_S} = b_x''\cos\phi + b_z''\sin\phi \quad (7c)$$

$$b_{z_S} = -b_x''\sin\phi + b_z''\cos\phi \quad (7d)$$

$$\frac{1}{r^3} = -\frac{b_{x_S}}{4} + \sqrt{\frac{9}{16}b_{x_S}^2 + \frac{1}{2}b_{z_S}^2} \quad (7e)$$

$$\tan\alpha = \frac{b_{z_S}}{\frac{1}{r^3} + b_{x_S}} \quad (7f)$$

Equations (7a-7f) are based on the known magnetic dipole equations in which $b_{x_s}$ and $b_{z_s}$ are defined by Equations 7c and 7d. FIG. 7d illustrates the variables $\phi$, $\alpha$ and r in relation to the x and z axes of the overall coordinate system and the center of antenna 82.

With values for S and D in hand, the position coordinates (x,y,z) of the boring tool in the coordinate system shown in FIG. 7b are then determined by reversing the rotation by $\delta$ about the X axis and the rotation by $\beta_{xmtr}$ about the Z axis, given by:

$$(x,y,z) = R(Z, \beta_{xmtr}) * R(X, -\delta) * (-S, 0, D) \quad (8)$$

Where "S" is the horizontal distance between the portable device and the boring tool and D is the depth of the boring tool. Applicants recognize that the location of the boring tool can be determined even after it passes from a first, approaching side 752 of the portable device to a second, departing side 754 of the bore plan, for example, as will be described below with respect to intermediate target positions. It is noted that the boring tool passing from the approaching side to the departing side is equivalent to a rotation of the portable device of 180 degrees about the Z axis, i.e. the magnetic fields measured by the locator can be transformed such that ($b_x'$, $b_y'$, $b_z'$) → ($-b_x'$, $-b_y'$, $b_z'$). Based on the foregoing, which uses the orientation of the portable device and the orientation of the boring tool, with respect to the bore plan, the relative position of the boring tool is determined with respect to the portable device which, in turn, provides for guiding the boring tool to any location within the receiving range of the portable device. For purposes of the present disclosure, the homing mode is considered to encompass guidance of the boring tool to any target position based on electromagnetic signal 66, so long as the portable device, as offset from that target position, is within receiving range from the boring tool.

In the homing mode and with reference to FIG. 7c, device 80 can be selectively configured in two different ways with respect to providing a homing target for the boring tool 60, as discussed above. Both homing configurations are described, for example, in U.S. Pat. No. 6,250,402 (hereinafter, the '402 patent), which is commonly owned with the present application and hereby incorporated by reference, such that left/right and up/down homing commands can be generated to guide the boring tool to either the device or to the offset target. Further, this arrangement, like Equations 7a and 7b above, determines a depth D of the boring tool and a horizontal distance S from the boring tool to the target, for example, in accordance with the '402 patent. U.S. Pat. No. 6,727,704, which is commonly owned with the present application and hereby incorporated by reference, brings to light still further advanced methods for generating homing commands and related information in which the position of the target is not constrained to being directly below the portable device. Information relating to the generation of homing commands and homing commands themselves can be transmitted from portable device 80 via signal 99 to boring tool 20. This information can then be transmitted up the drill string to the drill rig using drill string transceiver 64 (FIG. 1) and drill rig transceiver 400 (FIG. 3) such that the boring tool serves as a relay. System 10 also provides for communication of homing commands and related information to the drill rig by using telemetry signal 94 (FIG. 1) that can be received by telemetry antenna 97 at the drill rig or other suitable location. In yet another configuration, a portable device can utilize a joystick or other suitable mechanism that allows an operator of the portable device to directly generate drill rig actuation commands. By way of non-limiting example, one such device is described in commonly owned U.S. Pat. No. 6,079,506 (hereinafter, the '506 patent), which is hereby incorporated by reference in its entirety. In particular, handheld portable device 140 includes a joystick 148, as shown in FIGS. 3 and 4 of the '506 patent. Using such a joystick, any suitable set of drill rig actuation commands can be selectively issued to the operator at the drill rig. It is noted that the homing commands can be generated by either the portable device 80 or processing arrangement 46 at the drill rig. For purposes of the processing arrangement at the drill rig generating homing commands, the portable device can transfer signal strength readings of electromagnetic homing signal 66 to the drill rig as the basis for determining the homing commands. With this overall disclosure in hand, it is considered that one of ordinary skill in the art can readily adapt any system that reasonably produces steering mode and homing mode commands in accordance with the teachings that have been brought to light herein.

It is important to understand that the guidance provided to the operator through the user interface (FIG. 6) can be identical whether the system is in steering mode or homing mode. That is, no change in the appearance of the display of FIG. 6 need be made for purposes of switching from the steering mode to the homing mode. This mode switch can be completely transparent to the operator. If desired, "Steering" and "Homing" indications can be provided on screen 600, although this is not required.

Referring to FIG. 7e, a region 700' is shown in a plan view of the X-Y plane including another example of a predetermined bore plan 704', which leads to target location $T_{BP}$, which is the end point of the bore plan An actual path 710' taken by the boring tool is indicated using a solid line. In this example, bore plan 704' may be substantially longer than bore plan 704 of FIG. 7a such that there can be significantly more accumulated error during the steering mode, if no compensation is applied. In order to compensate or eliminate the accumulated error, portable device 80 can be moved to sequentially define one or more intermediate targets, each of which can be directly on the bore plan, as the boring tool progresses there along. As the boring tool approaches a receiving range 714', associated with a first intermediate target $I_1$, in the steering mode, the homing mode can be entered at a point 760 such that the steering mode then guides the boring tool to $I_1$, thereby eliminating accumulated error. The latter can be seen as an offset between the bore plan and the actual path at the boundary of receiving range 714'. The system can continue operation in the homing mode, once the boring tool passes $I_1$, until the boring tool exits receiving range 714' at a point 764, whereupon operation switches back to the steering mode. On a segment of the bore plan leading from $I_1$ to second intermediate target $I_2$, the figure again illustrates accumulated error in the steering mode as divergence between the actual path and the bore plan. As the boring tool approaches a receiving range 714", associated with a second intermediate target $I_2$, in the steering mode, the homing mode can again be entered at a point 770 such that the steering mode then guides the boring tool to $I_2$, continuing to a point 774 where the boring tool leaves receiving range 714", thereby again eliminating accumulated error. After passing point 774, the boring tool proceeds to target location $T_{BP}$ in the manner described above with regard to FIG. 7a. It should be understood that, in the example of FIG. 7e, the end point of the bore plan $T_{BP}$ coincides with the target position T that is defined by the portable device, whether that target position is offset vertically and/or horizontally from the actual physical location of the portable device or not. In another embodiment, more than one portable device 80 can be used such that it is not always necessary to move a single portable device to the next intermediate target or final target position. In another embodiment, one or more intermediate targets can be positioned offset from the bore plan. For example, it may be discovered that there is an obstacle directly on the bore plan which was unknown to the designer of the bore plan. The boring tool can be guided around the obstacle in the homing mode, using a series of intermediate targets. Once the obstacle has been avoided, the boring tool can be returned to the bore plan, for example, using an intermediate target on the bore plan and then proceed in the steering mode.

Referring to FIG. 7f, a diagrammatic illustration, generally indicated by the reference number 780, is provided to facilitate a description of a method for the generation of steering indications for use in returning the boring tool oriented in a current direction 782 to a bore path 784. In order to generate a steering indication (FIG. 6) for a current position 786 of the boring tool, the first step is to determine a desired path 788, having an initial desired orientation 790, that follows a bend radius R from current position 786 and current direction 782 to meet and converge on bore plan 784 in the correct direction. Current position 786 can either be the integrated position based on integration of pitch and yaw in the steering mode or determined based on electromagnetic field 66 emitted from the boring tool, for example, by moving portable device on the surface of the ground to identify a point that is directly overhead of the boring tool.

Still referring to FIG. 7f, distance "a" is a lateral distance between current position 786 and bore plan 784. Distance "b" is a longitudinal distance between current position 786 and a point 792 at which desired path 788 reaches the bore plan. Desired path 788, with a bend radius R, from the current position to the bore plan is shown by a dashed line. An angle φ is formed between a horizontal line 794 parallel to the bore plan and desired direction 790. The relationship between these parameters is given by:

$$\mu = \tan^{-1}(b/a) \quad (9a)$$

$$\omega = 2\mu \quad (9b)$$

$$R = \sqrt{a^2 + b^2}/[2\sin(\mu)] \quad (9c)$$

If current direction 782 of the boring tool forms an angle λ with respect to horizontal line 794, then the steering indication parameter is given by Equations 4a-4c, with either Δβ or Δφ equal to ω-λ, depending on whether the lateral displacement from the bore plan is in the vertical or horizontal direction, respectively. In these determinations, the vertical and horizontal displacements from the bore plan can be treated separately to determine the desired changes in pitch and yaw. In this regard, the plane of the view in FIG. 7f can be either a horizontal plane showing an overhead view of the drilling region or a vertical plane showing the boring tool underground in relation to the bore plan. In another embodiment, the horizontal displacement and desired direction can be determined in three dimensions and later separated into the desired pitch and yaw components. The determinations can be carried out to achieve a desired bend radius that corresponds to the minimum bend radius of the drill string.

Referring to FIGS. 7a and 7c, the decision as to when to switch from the steering mode to the homing mode can be determined by a number of different methods. In one embodiment, the drill rig operator decides when to switch modes and can perform the switch manually at the drill rig. In one feature, the option to manually switch to the homing mode can be provided only when the portable device is within receiving range of the boring tool based on monitoring electromagnetic signal 66. In another embodiment, portable device 80 can be instructed by its operator to issue a command to the processor at the drill rig to switch modes. In some embodiments, the mode switch can be made automatically, without operator action. In one automatic switching embodiment, the switch between modes can be based on the strength of electromagnetic signal 66 measured by portable device 80, from which the distance between the boring tool and the portable device can be determined. In one embodiment, the determination of when to switch between guidance modes (i.e., steering and homing) can be based solely on a single distance measurement or on an average of successive distance measurements, and the decision can also take into consideration the variance in successive distance measurements, although this is not required. For example, assume that portable device 80 determines distance, D, between the boring tool and the portable device at regular intervals, such as once per second. The mean and standard deviation of a succession of N distance measurements $D_N$ are given, respectively, by:

$$\langle D \rangle = \frac{1}{N} \sum_{i=1}^{N} D_i \quad (10)$$

$$\sigma_D = \sqrt{\frac{1}{N} \sum_{i=1}^{N} (D_i - \langle D \rangle)^2} \quad (11)$$

In Equations (10) and (11), $D_i$ is the $i^{th}$ measurement of the distance D and $\langle D \rangle$ is the mean distance. The switch from steering mode to homing mode can be set to occur when $\langle D \rangle < X$ feet, and $\sigma_D < Y$ feet, with X and Y being thresholds.

In another embodiment, the choice of which mode to use can be determined by selecting the mode that provides the smallest uncertainty in position. In another automatic switching embodiment, switching between steering and homing modes can combine the guidance information of both modes, weighted by their respective uncertainties. First, define $$\Delta(X,Y)_{homing} = F \quad (12a)$$

$$\Delta Z_{homing} = G \quad (12b)$$

$$\Delta(X,Y)_{steering} = \Psi \quad (12c)$$

$$\Delta Z_{steering} = \Gamma \quad (12d)$$

Where $\Delta(X,Y)_{homing}$ is the horizontal homing command, $\Delta Z_{homing}$ is the vertical homing command, $\Delta(X,Y)_{steering}$ is the horizontal steering command and $\Delta Z_{steering}$ is the vertical steering command.

The guidance parameters are then weighted by their uncertainties such that $$\Delta(X, Y) = \Psi + \left[(F - \Psi) * \frac{\sigma_\Psi^2}{\sigma_\Psi^2 + \sigma_F^2}\right] \quad (13a)$$

$$\Delta Z = \Gamma \left[(G - \Gamma) * \frac{\sigma_\Gamma^2}{\sigma_\Gamma^2 + \sigma_G^2}\right] \quad (13b)$$

where $\sigma_a^2$ is the squared standard deviation of a given parameter (a), $\Delta(X,Y)$ of Equation (13a) represents a combined horizontal steering command and $\Delta Z$ of Equation (13b) represents a combined vertical steering command. It should be appreciated that the sensor inputs on which the steering commands and homing commands are based exhibit a standard deviation which is reflected as a standard deviation of the steering commands and the homing commands. When the boring tool is far from the locator, the uncertainty in F is much larger than the uncertainty in $\Psi (\sigma_F^2 >> \sigma_\Psi^2)$, so Equation (13a) becomes $\Delta(X,Y) \approx \Psi$. Similarly, when the boring tool is very near to the portable device the uncertainty in $\Psi$ is much larger than the uncertainty in $F(\sigma_\Psi^2 >> \sigma_F^2)$, and Equation (13a) becomes $\Delta(X,Y) \approx F$. As should be clear based on the discussions above, the target location can either be the end of an overall bore, or an intermediate target or point along the bore plan. For example, to complete a 500 foot bore the drill operator can place portable device 80 at 250 feet from the drill rig and initially drill to the portable device in the manner described above. The operator can then move the portable device another 250 feet proximate to the target at the end of the bore plan and complete the drilling. Either of the 250 foot sections can be river or road crossings where walkover locating would be impossible or dangerous.

Attention is now directed to FIG. 8 which is a flow diagram illustrating an embodiment of a method for the operation of system 10, generally indicated by the reference number 800. The method begins at 802 and proceeds to 806 which establishes a bore plan, for example, as described above. At 810, the drilling array is set up. This can include, for example, orienting the drill rig at least approximately in the drilling direction (i.e., along the X axis) and arranging the boring tool at the start position. Further, portable device 80 can be positioned so as to establish the target position for terminating the drill run. At 814, drilling begins with operation in the steering mode. At 818, testing is performed relating to switching to the homing mode in any suitable manner. In one embodiment, the signal strength for the reception of electromagnetic signal 66 is periodically tested. The signal strength can be compared to a threshold value such that operation will subsequently switch to the homing mode once the signal strength is higher than the threshold value. The test interval can be any suitable value such as, for example, 30 seconds. Embodiments can use a test interval within the range from 1 to 60 seconds. In another embodiment, the test can be based on the mean and standard deviation of a succession of N distance measurements $D_N$, per Equations (10) and (11) above. In still another embodiment, the test can be based on selecting the mode that provides the smallest uncertainty in position. In yet another embodiment, the test can be based on combining the guidance information of both modes, weighted by their respective uncertainties based on Equations (12a)-(12d). At 820, the test of step 818 determines whether operation remains in the steering mode by branching to 814 or switches to homing mode by proceeding to 824. In some embodiments, the portable device can generate a command instructing the processor at the drill rig to switch to the homing mode and can transmit this command to the drill rig either by telemetry directly to the drill rig or by using signal 99 to transmit the command to the boring tool such that the latter can then relay the command to the drill rig by transmitting the command up the drill string. At 828, the boring tool arrives at the target position or intermediate target position. If the boring tool arrives at a target position, the method concludes. On the other hand, if the boring tool arrives at an intermediate target position, operation can return to the steering mode once the boring tool is out of receiving range from the intermediate target, as indicated by a dashed line 830. During the operation of step 828, loss of reception of the electromagnetic signal causes operation to return to the steering mode at 814.

Numerical simulations were carried out to estimate the performance of the operation of system 10 in the steering mode. For purposes of the simulations, the following assumptions were made:

Each pipe is 10' long,

The bore length is 500', and

The operator receives imperfect pitch and yaw information at the beginning of each pipe, but uses that information perfectly to follow the desired bore plan—in other words, if the yaw and pitch information were perfect the user would exactly follow the bore plan.

The pitch and yaw information has four possible sources of error:

Yaw noise,

Yaw systematic error,

Pitch noise, and

Pitch systematic error.

The pitch systematic error was assumed to be zero and the following values were used for three other sources of error:

Yaw noise standard deviation of 0.1 degrees,

Yaw systematic error of 0.046 degrees/degree, and

Pitch noise standard deviation of 0.007 degrees.

Three sets of simulations were carried out based on hypothetical bore plans, as illustrated by FIGS. 9-11. Each of these figures diagrammatically illustrates a bore plan plotted against the X axis and showing variation corresponding to the Y axis using a dashed line and variation corresponding to the Z axis using a solid line. In FIG. 9, a straight bore plan, generally indicated by the reference number 900, is shown such that the path in the X/Y plane between a starting position 904 and a target position 908 comprises a straight line. For purposes of these examples, it is assumed that the target location or endpoint $T_{BP}$ of the bore plan coincides with target position T defined by the portable device. Entry and exit profiles can be seen on the Z axis plot between which a straight segment 910 is formed at approximately −8 feet. FIG. 10 illustrates a curved bore plan, generally indicated by the reference number 1000, such that a curved path 1002 between a starting position 1004 and a target position 1008 is defined, as shown in plan view with respect to the Y axis. Entry and exit profiles can be seen on the Z axis plot and match those of FIG. 9 having a straight segment 1010 therebetween at approximately −8 feet. FIG. 11 illustrates a curved bore plan, generally indicated by the reference number 1100, such that a curved path 1102 between a starting position 1104 and a target position 1108 is defined, as shown in plan view with respect to the Y axis. Entry and exit profiles can be seen on the Z axis plot and match those of FIGS. 9 and 10 between which a straight segment 1110 is defined at approximately −8 feet, although it is noted that the vertical scale in FIG. 11 has been changed in order to illustrate the relatively increased curvature along the Y axis.

For each bore plan of FIGS. 9-11, a set of simulations was performed. In particular, 10,000 simulation runs were carried out for each bore plan to determine the mean and standard deviation of the errors in X, Y and Z. The errors in X, Y and Z are defined as the difference between the true location at the end of the bore and the end point of the bore plan. An example of a single simulation run (for the straight bore plan of FIG. 9) is shown in FIG. 12. The latter is an error plot, generally indicated by the reference number 1200, illustrating errors in X (shown as a dotted line 1202), Y (shown as a dashed line 1206) and Z (shown as a solid line 1208) plotted against the X axis. In the simulation corresponding to FIG. 12, the errors in X, Y, and Z at the end of the bore were approximately 0.02', 0.01', and −0.2', respectively.

Table 1, below, provides the mean and standard deviation of the accumulated positional errors in X, Y, and Z for straight numerical simulation bore plan 900 of FIG. 9, the first curved numerical simulation bore plane 1000 of FIG. 10 and the second curved numerical simulation bore plan of FIG. 11.

TABLE 1

Numerical Bore Plan Simulations

| Bore | Mean (inches) | | | Standard Deviation (inches) | | |
|---|---|---|---|---|---|---|
| | X | Y | Z | X | Y | Z |
| Straight 900 | 0.2 | 4.8 | 0.1 | 0.0 | 3.6 | 0.1 |
| Curved 1000 | 0.2 | 5.5 | 0.1 | 0.1 | 4.1 | 0.1 |
| Curved 1100 | 0.8 | 11.9 | 0.1 | 0.3 | 5.8 | 0.1 |

For all of the simulated bore plans, the accumulated positional errors for the X and Z axes are negligible. The accumulated positional errors along the Y axis for straight bore plan 900 and first curved bore plan 1000 were approximately 5 inches and, for the second curved bore plan 1100, approximately 12 inches. It should be appreciated that all of these accumulated positional errors are sufficiently small such that when the transmitter reaches the receiving range of portable device 80 and shifts to the homing mode, the operator can effectively steer to the target position, based on the homing commands, to correct for the positional error that accumulated during the steering mode. Even for second curved bore 1100, 95% of the time (mean plus two standard deviations) the transmitter was within 2 feet of the target location. Typically, homing operation can begin once the boring tool reaches 35 feet from the portable device. Correcting for 2 feet of error starting 35 feet from the portable device requires a pipe bend radius of approximately 300 feet, which is a reasonable amount of bend for standard 2.375 inch drill pipe.

In view of the foregoing, the present disclosure at least provides for:

The ability to carry out HDD (Horizontal Directional Drilling) crossings, namely drilling under regions where conventional walkover locating is not possible, and correction to the position errors that inevitably accumulate, and The ability to drill without a walkover locating operator, thereby freeing up a skilled worker to carry out other duties. This is facilitated, at least in part, based on a system architecture which transmits data from the boring tool to the drill rig using the drill string as an electrical conductor at least during a steering mode, as will be further described in detail below.

The present disclosure combines steering tool functionality, guidance and bore path determination using both a pitch and a yaw sensor, with homing. Switching between steering and homing modes is performed automatically, with the same user interface, so operation is identical to conventional homing.

The foregoing description of the invention has been presented for purposes of illustration and description. It is not intended to be exhaustive or to limit the invention to the precise form or forms disclosed, and other embodiments, modifications and variations may be possible in light of the above teachings wherein those of skill in the art will recognize certain modifications, permutations, additions and sub-combinations thereof.

What is claimed is:

1. An apparatus forming part of a system including a boring tool that is movable by a drill string having an extendable length that leads from the drill rig to the boring tool for performing a horizontal directional drilling operation that advances the boring tool through the ground, said apparatus comprising:
    a transmitter supported by the boring tool for transmitting an electromagnetic homing signal, said transmitter including a yaw sensor to measure a yaw orientation and an accelerometer for generating pitch readings that characterize a pitch orientation of the boring tool;
    a portable device configured for monitoring the electromagnetic homing signal and for receiving the electromagnetic homing signal in a homing mode for use in generation homing commands to guide the boring tool to a target position in relation to the portable device; and
    a processor configured for generating steering commands for guiding the boring tool based on a bore plan in a steering mode using the yaw orientation, the pitch readings and the extendable length of the drill string such that at least some positional error is introduced between an actual position of the inground tool and a predicted location of the inground tool and for switching from the steering mode to the homing mode based at least in part on said monitoring of the electromagnetic homing signal and as the boring tool approaches the portable device guiding the boring tool to the target position in compensation for said positional error by blending the homing commands with the steering commands.

2. The apparatus of claim 1 wherein said blending weights the homing commands and the steering commands based on uncertainties that are associated with each of the homing commands and the steering commands.

3. The apparatus of claim 2 wherein the uncertainties are based on a standard deviation of the homing commands and a standard deviation of the steering commands.

4. The apparatus of claim 2 wherein the homing command is increasingly weighted based on an increasing signal strength of the electromagnetic homing signal as received by the portable device.

5. The apparatus of claim 1 wherein the portable device generates the homing commands.

6. The apparatus of claim 1 wherein the processor generates the homing commands.

7. The apparatus of claim 1 wherein said processor is located at the drill rig.

* * * * *